(12) United States Patent
Campbell et al.

(10) Patent No.: US 7,536,754 B2
(45) Date of Patent: May 26, 2009

(54) SWAGED SYNTHETIC CABLE TERMINATIONS

(75) Inventors: Richard V. Campbell, Tallahassee, FL (US); Kevin J. Barefield, Havana, FL (US)

(73) Assignee: Bright Technologies, LLC., Havana, FL (US)

( * ) Notice: Subject to any disclaimer, the term of this patent is extended or adjusted under 35 U.S.C. 154(b) by 127 days.

(21) Appl. No.: 11/218,402

(22) Filed: Sep. 2, 2005

(65) Prior Publication Data

US 2006/0160435 A1 Jul. 20, 2006

Related U.S. Application Data

(60) Provisional application No. 60/644,169, filed on Jan. 14, 2005, provisional application No. 60/644,170, filed on Jan. 14, 2005, provisional application No. 60/693,687, filed on Jun. 24, 2005.

(51) Int. Cl.
*A44B 21/00* (2006.01)
*F16G 11/05* (2006.01)

(52) U.S. Cl. ............... 24/265 R; 24/265 H; 24/265 AL; 24/115 A; 403/275

(58) Field of Classification Search .................. None
See application file for complete search history.

(56) References Cited

U.S. PATENT DOCUMENTS 1,121,736 A * 12/1914 Lee et al. .................... 24/122.3

* cited by examiner

*Primary Examiner*—Jack W. Lavinder
(74) *Attorney, Agent, or Firm*—J. Wiley Horton

(57) ABSTRACT

A connecting system which allows a standard rigging fixture to be connected to a synthetic cable termination by swaging. The cable termination is provided with a swaging sleeve. When the standard rigging fixture is placed next to the termination, this swaging sleeve is swaged over a portion of the standard rigging fixture in order to lock the standard rigging fixture to the termination. The provision of the swaging sleeve on the termination is accomplished using a variety of approaches, including forming the swaging sleeve as part of an anchor, providing a separate swaging sleeve attached by threads, and forming the anchor and swaging sleeve with two separate swaging operations.

6 Claims, 33 Drawing Sheets

SWAGED SYNTHETIC CABLE TERMINATIONS

CROSS-REFERENCES TO RELATED APPLICATIONS

This is a non-provisional patent application claiming the benefit, under 37 CFR §1.53, of several earlier-filed provisional applications. The earlier-filed applications are as follows:

| Ser. No. | Named Inventor(s) | Filing Date |
| --- | --- | --- |
| 60/644,169 | Richard V. Campbell, Kevin J. Barefield | Jan. 14, 2005 |
| 60/644,170 | Richard V. Campbell, Kevin J. Barefield | Jan. 14, 2005 |
| 60/693,687 | Richard v. Campbell | Jun. 24, 2005 |

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of synthetic cables. More specifically, the invention comprises devices for attaching standard cable rigging fixtures to an end of a synthetic cable using swaging techniques.

2. Description of the Related Art

Devices for mounting a termination on the end of a wire, rope, or cable are disclosed in detail in copending U.S. Application Ser. No. 60/404,973 to Campbell, which is incorporated herein by reference.

The individual components of a cable are known by various terms, such as "fibers," "wires," or "strands." The nomenclature used often depends on the material used—such as steel "wire," hemp "fibers," or Kevlar "strands." This invention disclosed herein can be applied to virtually any type of cable assembly, though its main application is for use with synthetic cables. For purposes of uniformity, the individual components of the cables described will be referred to as "strands" throughout this application.

Some type of fitting must typically be added to a cable in order to transmit a load to the cable. An old example of this idea is to wrap one end of a cable back upon itself—usually around an "eye" or "thimble" device—then clamp the cable to itself with one or more U-bolts. The resulting assembly on the end of the cable is referred to as a "termination."

A more sophisticated approach is to provide a specialized fitting which can be deformed to lock it onto the end of a cable. This approach has traditionally been used with wire ropes. FIG. 1 shows a prior art wire rope 14. Standard rigging fixture 16 includes a socket 20 encompassed by a sleeve. The external surface of this sleeve is denoted as swaging surface 22. Some type of attachment feature is typically included—in this case eye 19.

Standard rigging fixture 16 is designed to be attached by a swaging operation. Those skilled in the art will know that the term "swaging" generally refers to plastically deforming one part over another part in order to lock them together. One example is swaging an automotive battery terminal onto the end of an electrical cable. A similar operation is carried out with the assembly of FIG. 1. Wire rope 14 is inserted into socket 20. Swaging surface 22 is then compressed in a swaging die.

FIG. 2 shows the assembly after the swaging operation. The diameter of the swaging surface has been plastically reduced in swaged region 24. The material has actually flowed plastically, meaning that the overall length is increased and the diameter reduced. The material is also compressed into the cavities between the wire rope strands, creating a mechanical interlock.

Swaging is often done with two piece or three piece dies. A deformed ridge may be created between the dies. A second swaging operation is done to eliminate this ridge. For a two-piece die, the first result is rotated about 90 degrees and re-swaged. For a three-piece die, the first result is rotated about 60 degrees and re-swaged. Three or more swaging steps may be needed to create a smooth and uniform exterior (if that it desired).

The result is the assembly shown in FIG. 2. The arrows depict the compressive forces of the swaging die, which has produced the deformed state shown. Those skilled in the art will know that swaging produces a very secure and predictable attachment. It is a mature technology for which processes and tools are widely understood and available. Thus, swaging is a very popular approach to attaching fixtures to wire rope.

There are many rigging fixtures designed for swaging. FIG. 3 shows a few of these rigging fixtures. All incorporate a swaging surface 22. From left to right, FIG. 3 depicts an eye fixture, a threaded stud fixture, a hook fixture, and a T-hook ball fixture. All of these can be attached to a wire rope by the previously-described swaging operation. This fact gives the cable manufacturer great flexibility. A stock of wire rope and standard rigging fixtures can be maintained. When an order is placed, the manufacturer cuts the cable to length and swages on the desired rigging fixtures.

These rigging fixtures are largely standardized. As they are manufactured in large volumes, they are relatively inexpensive. Thus, the traditional field of wire rope manufacturing enjoys a considerable economy of scale.

The field of synthetic cables has not traditionally enjoyed this flexibility or economy, since the prior art approach for creating swaged terminations does not work well for synthetic cables. Synthetic cables have very fine strands. The strands also tend to be quite slick. Very high swaging pressures are therefore required to produce an acceptable joint. These high pressures tend to kink and distort the individual strands, since synthetic strands tend to have poor compressive resistance. Thus, the techniques described in FIGS. 1 and 2 are ill suited for use with synthetic cables.

FIG. 4 shows a termination which is typical for synthetic cables. Termination 12 is affixed to the end of a synthetic cable (shown sectioned in half for visual clarity). Anchor 18 is attached to the strands of the synthetic cable by a variety of techniques. The version shown is attached by potting a length of strands into an expanding central cavity through the anchor.

The term "potting"—which is well known to those skilled in the art—can be described as follows: The cable strands are typically splayed into a diverging pattern and infused with liquid potting compound (using a variety of known techniques). The liquid potting compound is any substance which transitions from a liquid to a solid over time. The most common example would be a cross-linking adhesive such as an epoxy. Those skilled in the art know that such adhesives use two separate liquids which cross-link when mixed together. Such a liquid is mixed just prior to wetting the strands.

The wetted strands are at some point placed in a cavity within the anchor (in some cases prior to wetting and in some cases after wetting), so that when the liquid potting compound hardens the strands will be locked to the anchor. The anchor and the portion of cable locked therein are then collectively referred to as a termination.

Potted region 44 consists of strands locked within the solidified potting compound. The anchor is thereby attached to the cable. The anchor has a first end which is approximately even with the end of the cable and a second end proximate to the cable but distal to the end of the cable (the lower end in the orientation shown in the view).

The termination of FIG. 4 is an effective attachment of an anchor to a synthetic cable. FIG. 5 shows completed termination 12 alongside a standard rigging fixture 16. The reader will observe that the termination is not configured to be attached to the standard rigging fixture. Thus, the hardware traditionally used for terminating a synthetic cable is ill-suited for use with standard rigging fixtures traditionally used for terminating wire rope.

BRIEF SUMMARY OF THE PRESENT INVENTION

The present invention comprises devices which allow a standard rigging fixture to be connected to a synthetic cable termination by swaging. The cable termination is provided with a swaging sleeve. When the standard rigging fixture is placed near the end of the termination, this swaging sleeve is swaged over a portion of the standard rigging fixture in order to lock the standard rigging fixture to the termination.

The provision of the swaging sleeve on the termination is accomplished using a variety of approaches, including forming the swaging sleeve as part of an anchor, providing a separate swaging sleeve attached by threads, and forming the anchor and swaging sleeve with two separate swaging operations.

REFERENCE NUMERALS IN THE DRAWINGS

| 10 | cable | 12 | termination |
|----|-------|----|-------------|
| 14 | wire rope | 16 | standard rigging fixture |
| 18 | anchor | 19 | eye |
| 20 | socket | 22 | swaging surface |
| 24 | swaged region | 26 | male threaded anchor |
| 28 | threaded coupler | 30 | swaging coupler |
| 31 | male thread | 32 | swaging sleeve |
| 34 | socket | 36 | strands |
| 37 | swaged region | 38 | spike |
| 40 | anchor swage | 42 | swaging coupler |
| 44 | potted region | 46 | relief |
| 48 | female thread | 50 | threaded shank |
| 54 | cannelure | 56 | swaged region |
| 58 | molded region | 60 | internal rib |
| 62 | enlarged portion | 64 | spacer |
| 65 | flared portion | 66 | reinforcing plug |
| 68 | internal swaging sleeve | 70 | knot |
| 72 | cross pin | 74 | hole |
| 76 | interwoven section | 78 | anchor seat |

-continued

| 80 | flanged swaging sleeve | 82 | threaded coupler |
| 84 | overhang | 86 | flange |
| 88 | locking rib | 90 | ring recess |

DETAILED DESCRIPTION OF THE INVENTION

Figure 4:
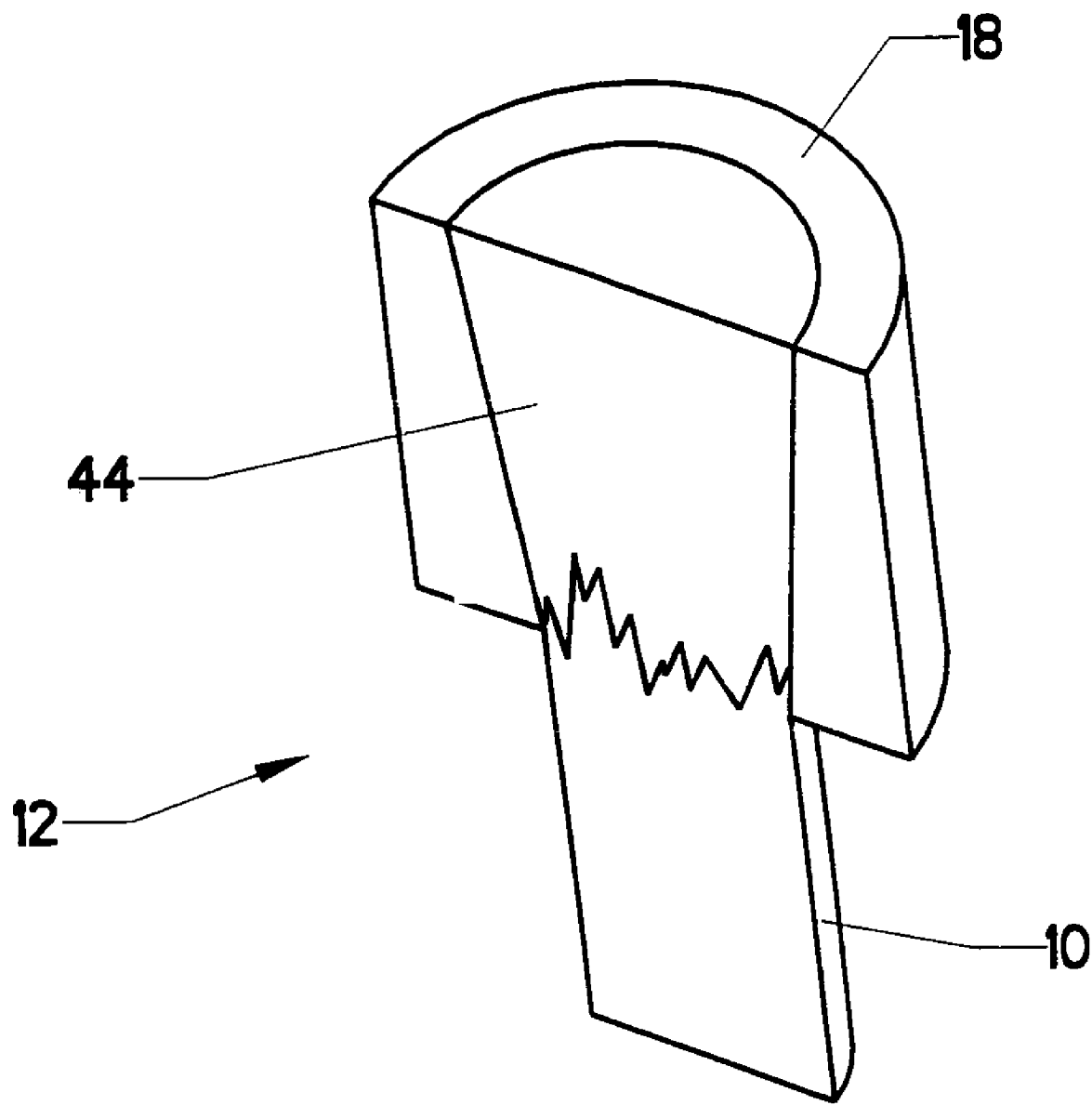
FIG. 4 is a section view, showing a termination for a synthetic cable.
Figure 5:
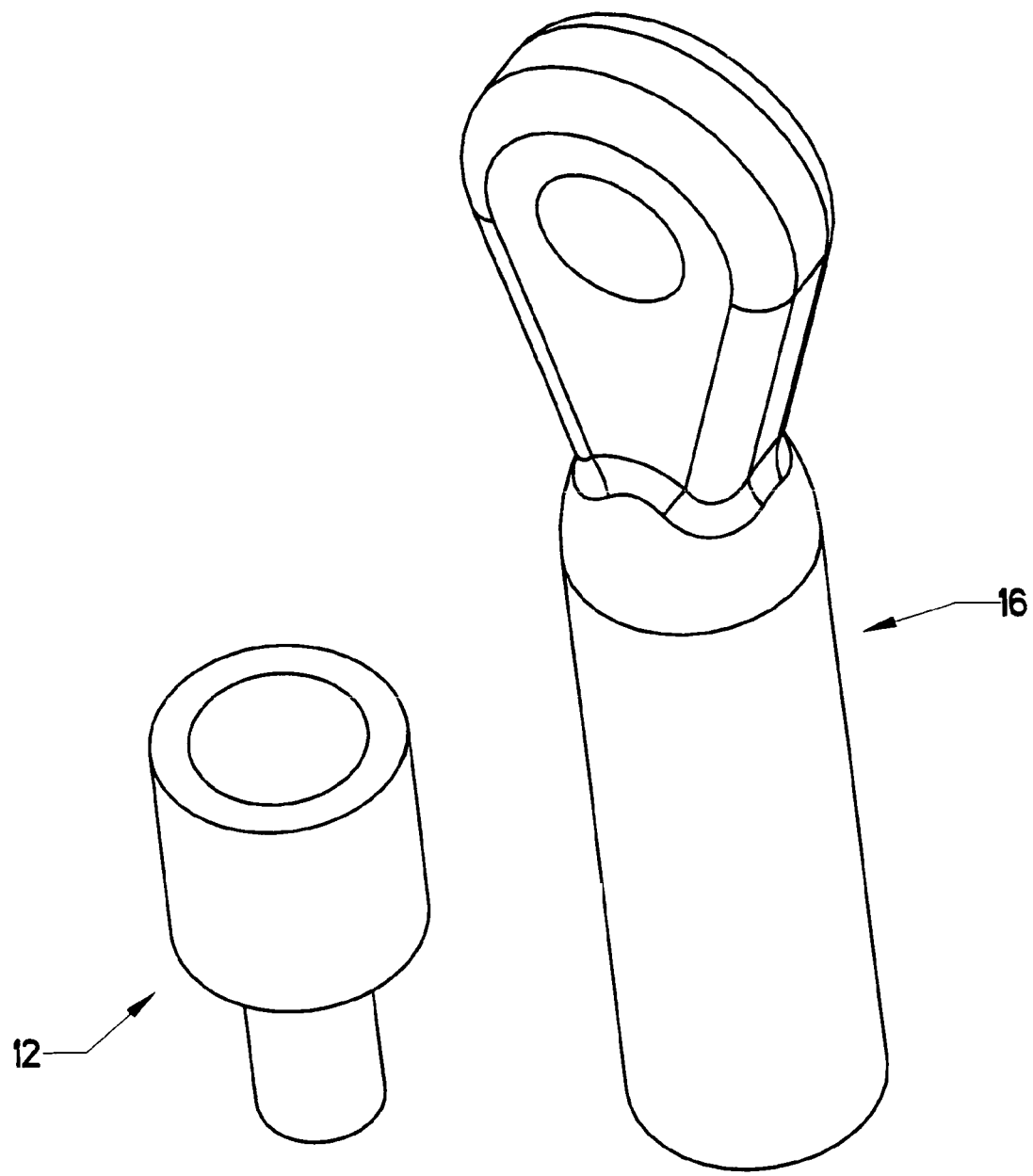
FIG. 5 is a perspective view, showing a synthetic cable termination alongside a prior art rigging fixture.
Figure 6:
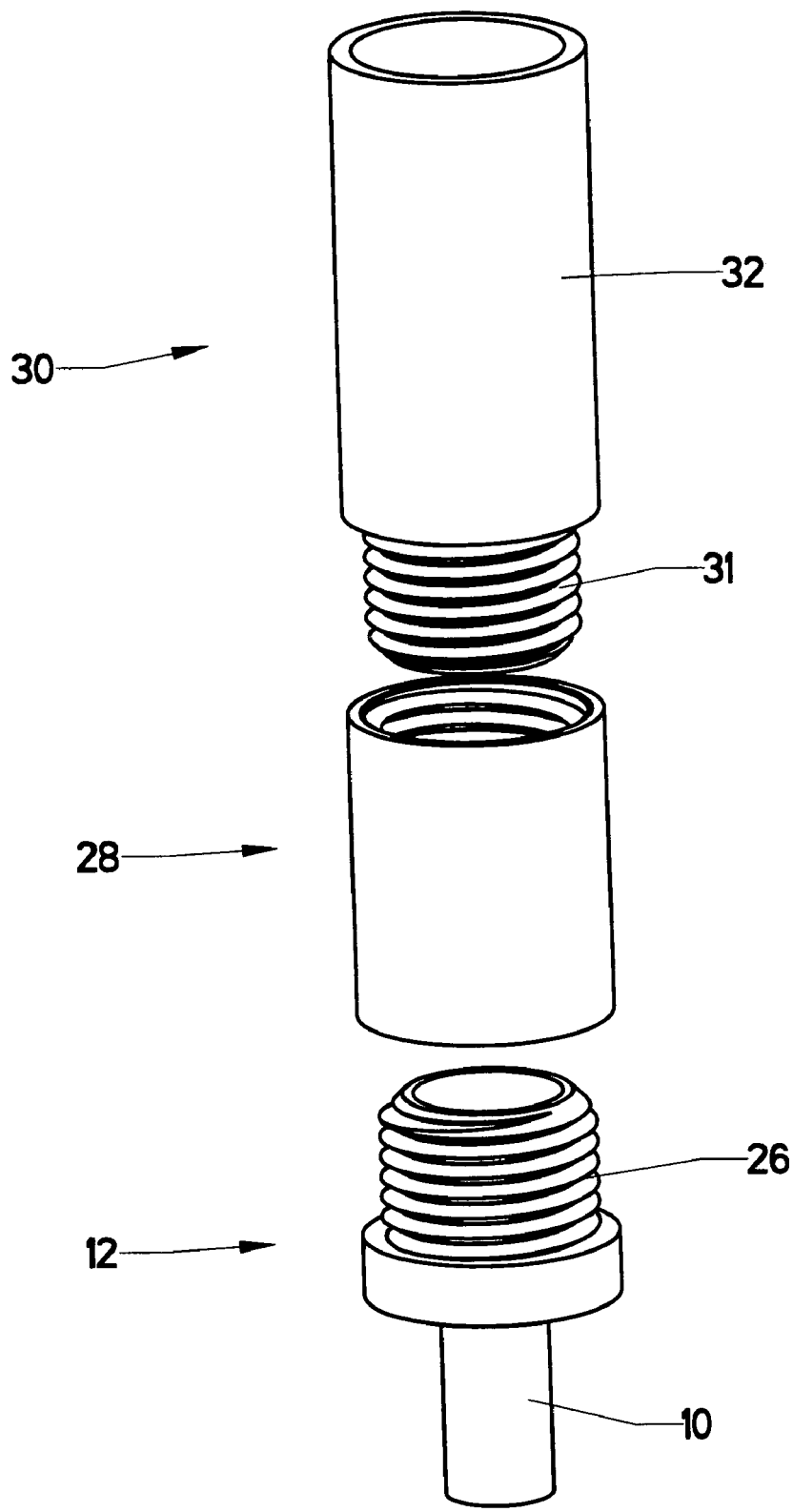
FIG. 6 is an exploded perspective view, showing a first embodiment of the present invention.

A goal of the present invention is to allow the use of standard rigging fixtures with terminations suitable for use on synthetic cables. FIG. 6 depicts an assembly which can accomplish this goal. Prior art anchor 18—as shown in FIG. 4—has been modified by adding a male thread to a portion of its outer surface. The revised anchor is designated male threaded anchor 26. Its internal features are similar to the prior art anchor. It contains an expanding cavity which securely holds the potted strands on the end of cable 10. The expanding cavity can assume many forms in addition to the conical shape shown.

Threaded coupler 28 screws over the male threads on the outside of male threaded anchor 26. The reader will note that threaded coupler 28 includes an internal (female) thread running from one end to the other. Swaging coupler 30 includes male thread 31, which is sized to screw into threaded coupler 28. Thus, male threaded anchor 26, threaded coupler 28, and swaging coupler 30 can all be screwed together. Swaging coupler 30 includes swaging sleeve 32 on the end opposite male thread 31.

Figure 6B:
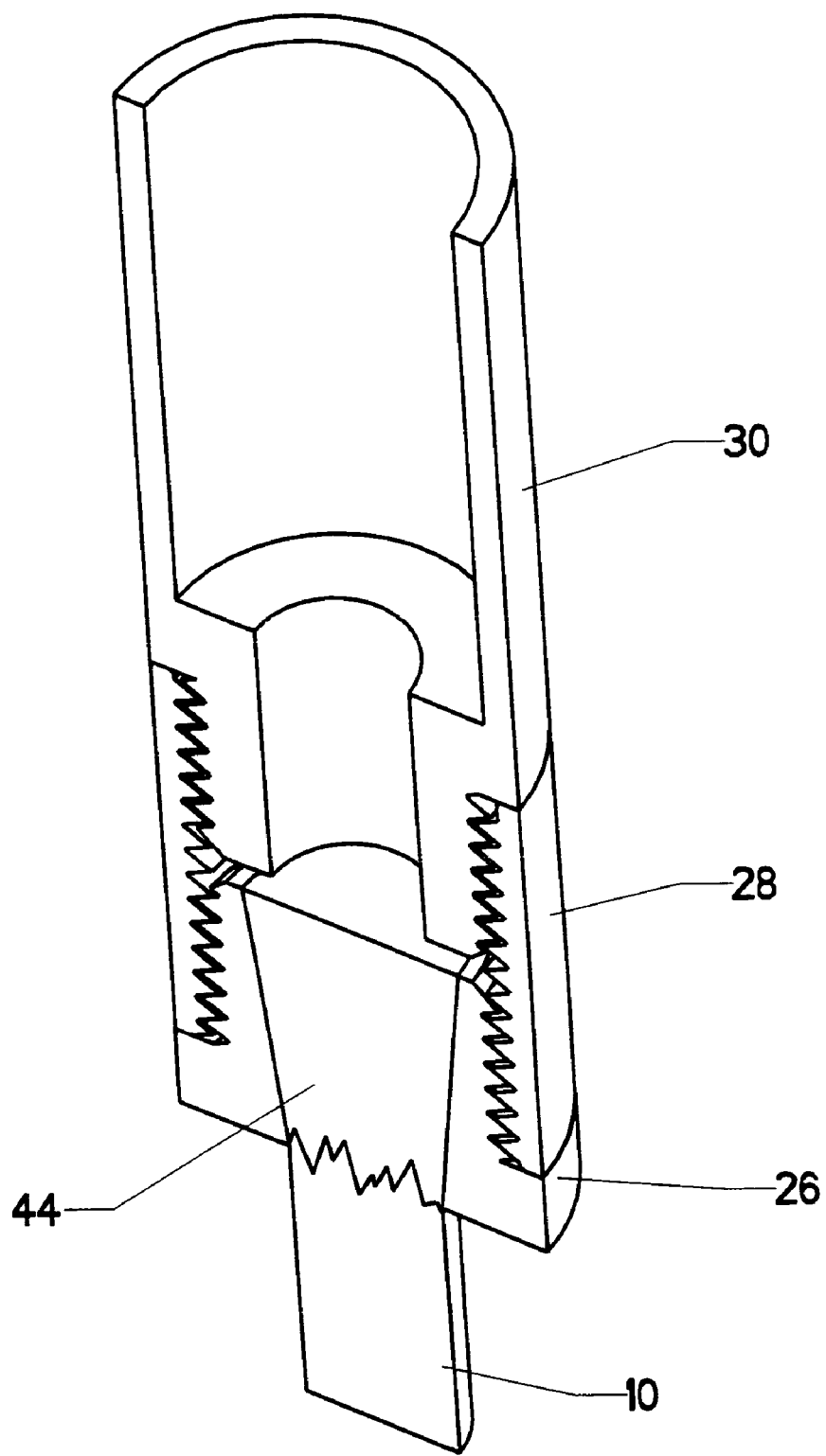
FIG. 6B is a section view, showing a first embodiment of the present invention.

FIG. 6B shows a section view of the assembly screwed together. The use of these components has provided the anchor with a swaging sleeve attached to the anchor and extending away from the cable. This swaging sleeve allows the anchor to be attached to a piece of standard rigging hardware using standard swaging techniques.

Figure 7:
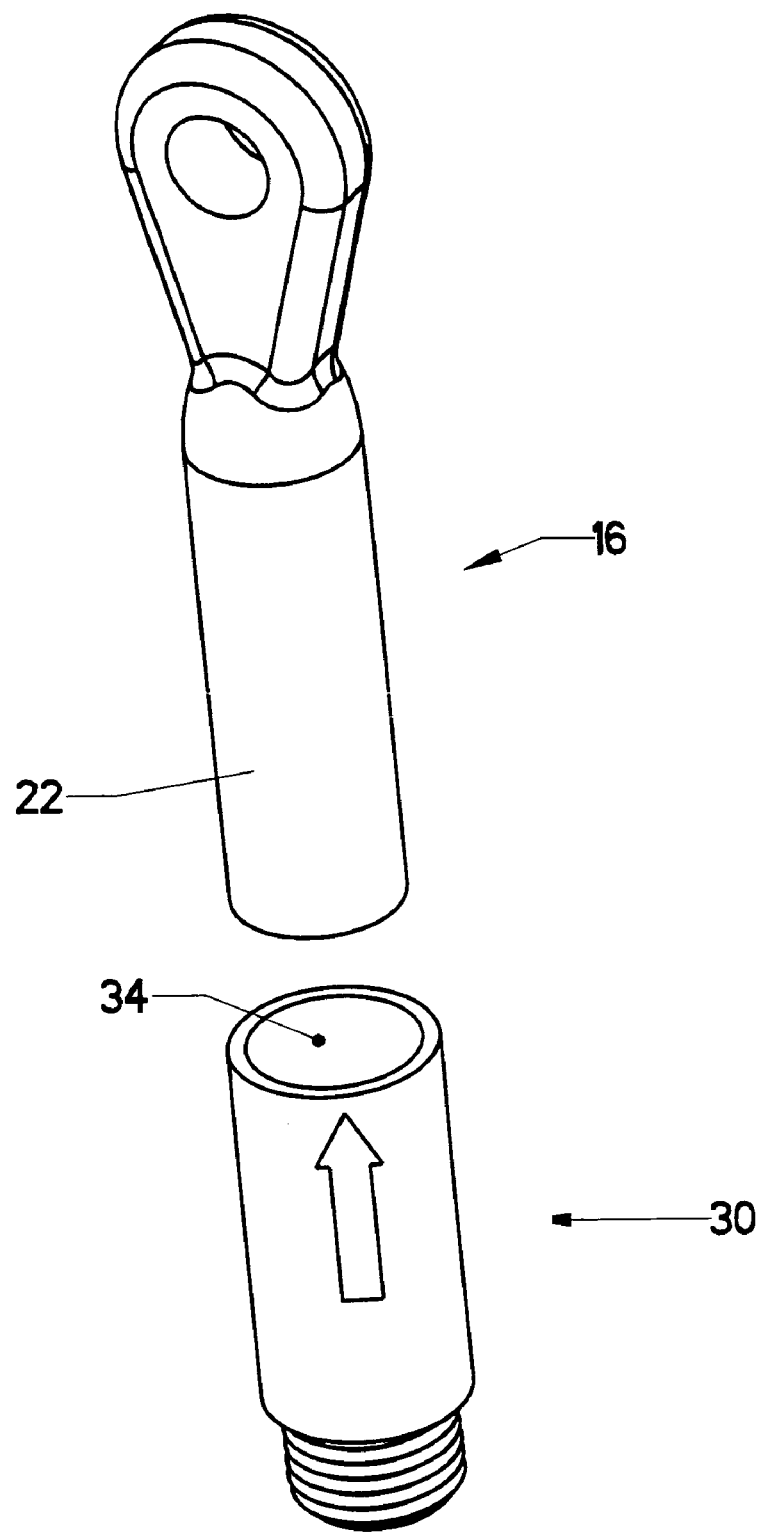
FIG. 7 is an exploded perspective view, showing how a swaging coupler slides onto a prior art rigging fixture.
Figure 8:
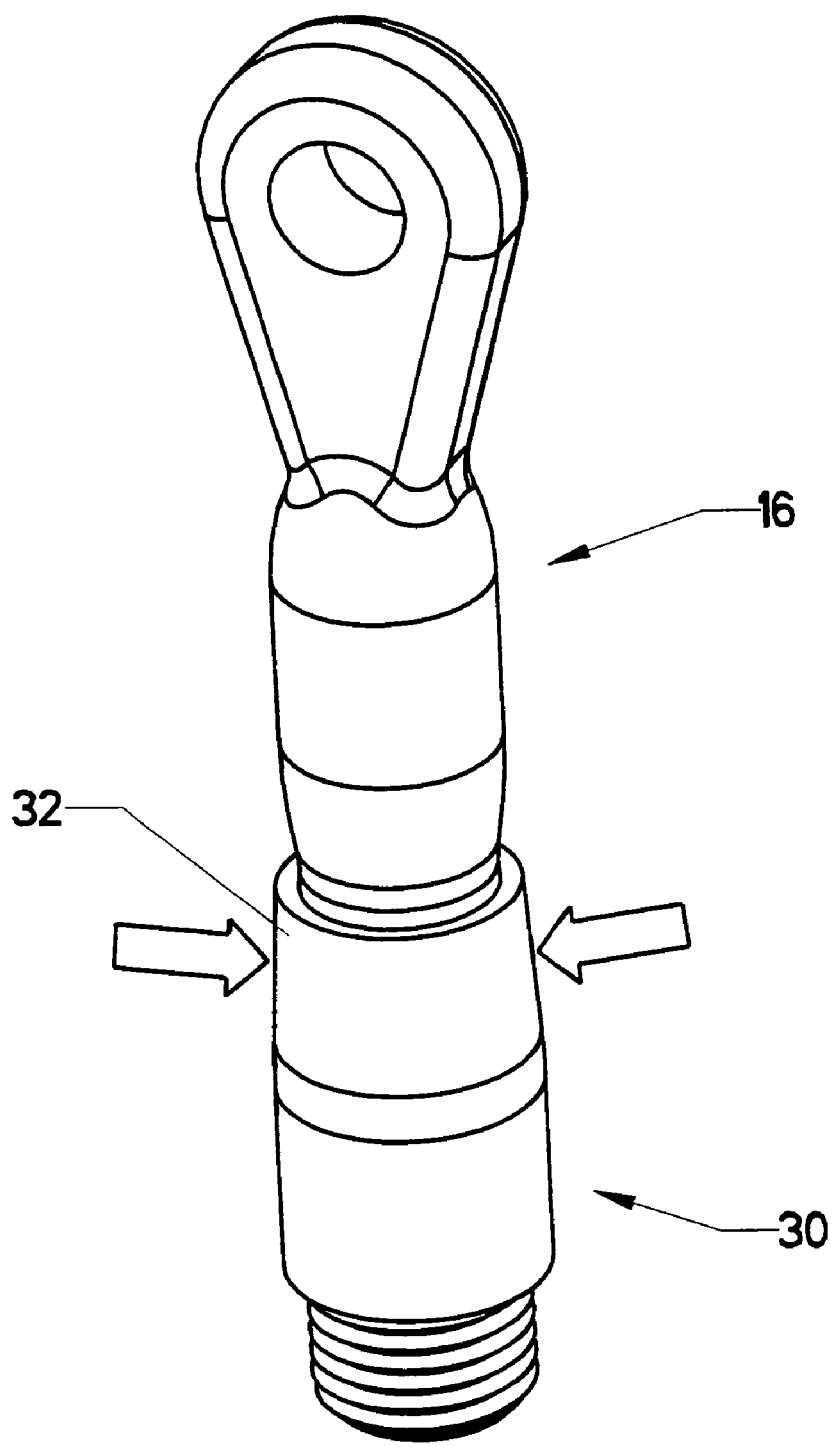
FIG. 8 is a perspective view, showing a swaging coupler swaged to a prior art rigging fixture.

FIG. 7 shows swaging coupler 30 positioned for assembly with standard rigging fixture 16. Swaging surface 22 on standard rigging fixture 16 slides into socket 34 in swaging coupler 30. Once the two components are thus mated, the overlapping portions are placed in a swaging die and swaged one or more times. Depending on the swaging die used, the result may look something like FIG. 8. Swaging sleeve 32 on swaging coupler 30 has been swaged inward to compress the overlapping portion. The swaging forces are graphically depicted by the arrows.

Figure 9:
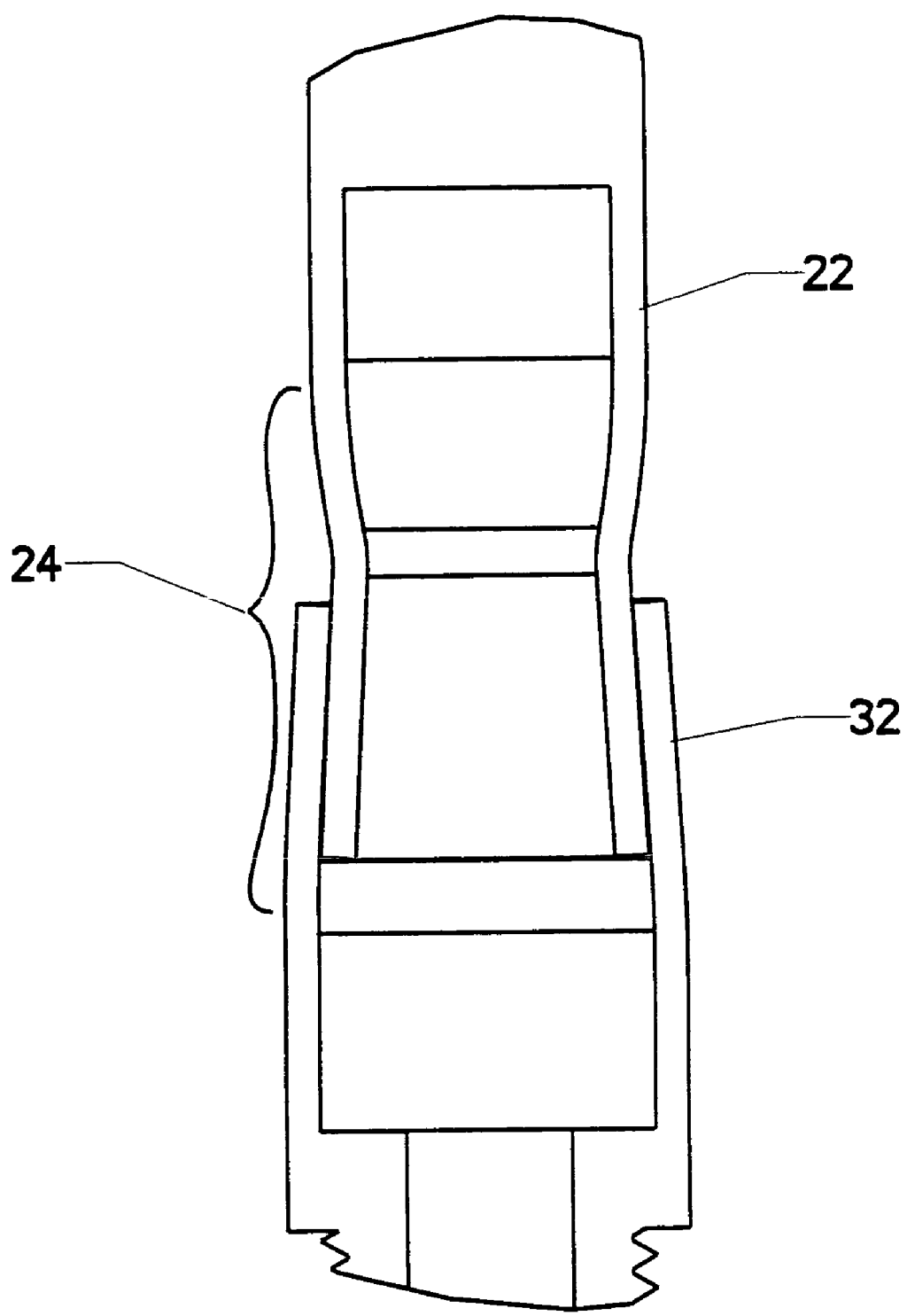
FIG. 9 is a sectioned elevation view, showing the swage of FIG. 8.

FIG. 9 shows a section view of the overlap. The reader will observe how the deformation has caused swaging sleeve 32 (on the swaging coupler) to overlap and "trap" swaging surface 22 on the standard rigging fixture through swaged region 24. Those skilled in the art will know that this type of swaged connection will withstand substantial tensile forces.

Figure 10:
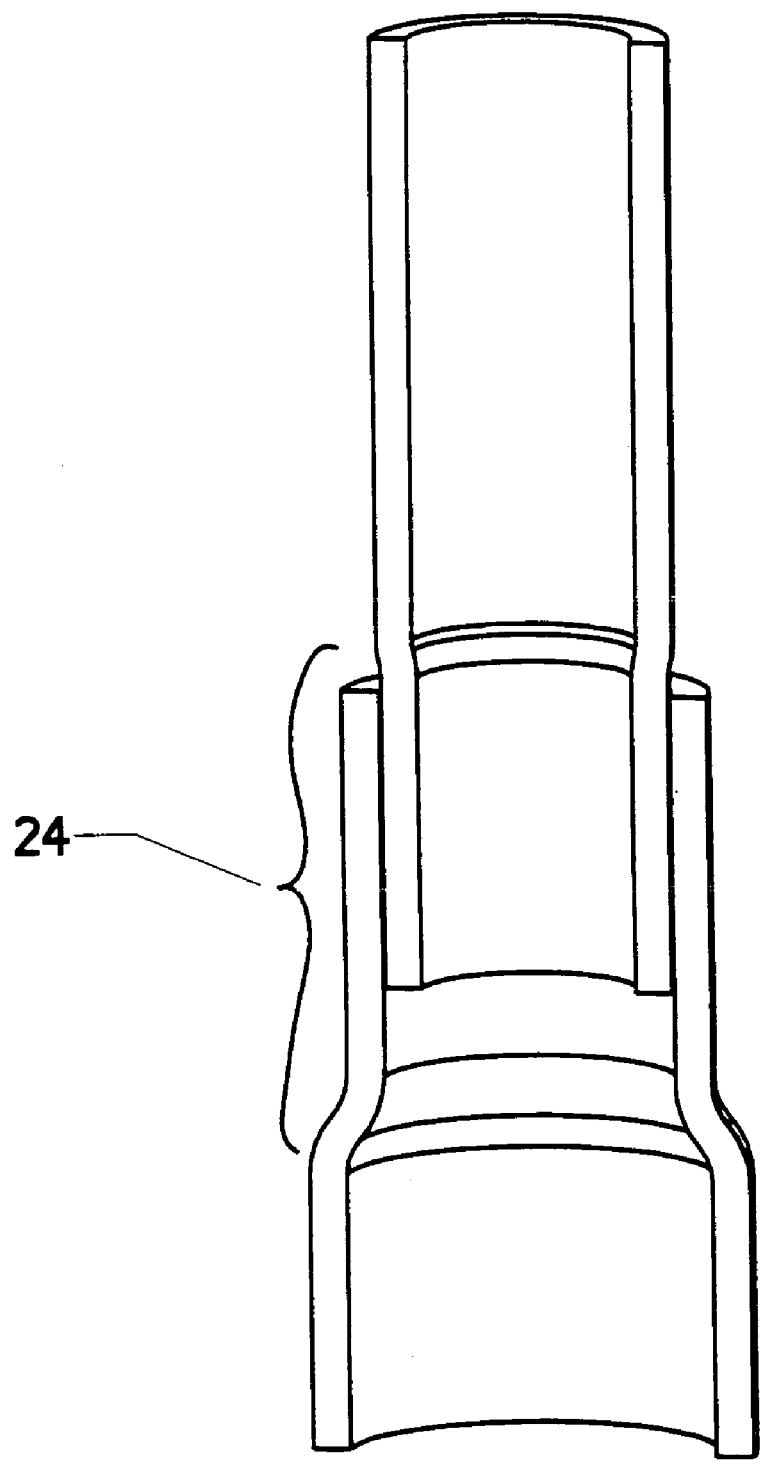
FIG. 10 is a sectioned elevation view, showing a swage using non-tapered wall sections.

Those skilled in the art will also know that the tapered type of connection shown in FIG. 9 is only one type among many. FIG. 10 shows the same components swaged together with a straight connection. A straight connection operates like a press fit. Though possibly not as strong as a tapered connection (which features a mechanical interference) the straight connection can nevertheless withstand substantial tensile force and is suitable for many applications. The reader should therefore not view the invention as being confined to any particular type off swaged connection.

Figure 11:
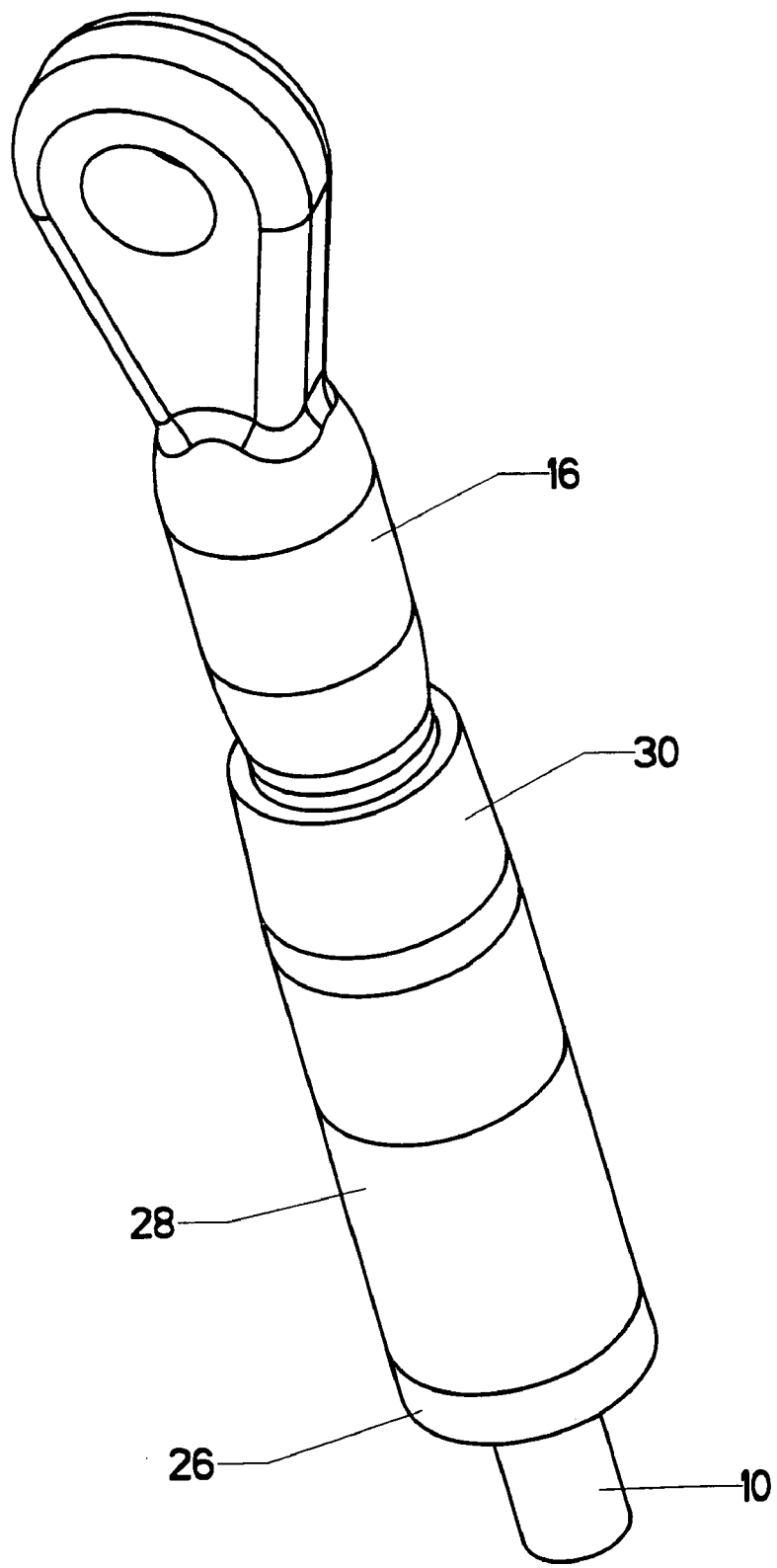
FIG. 11 is a perspective view, showing a completed cable and rigging fixture assembly.
Figure 12:
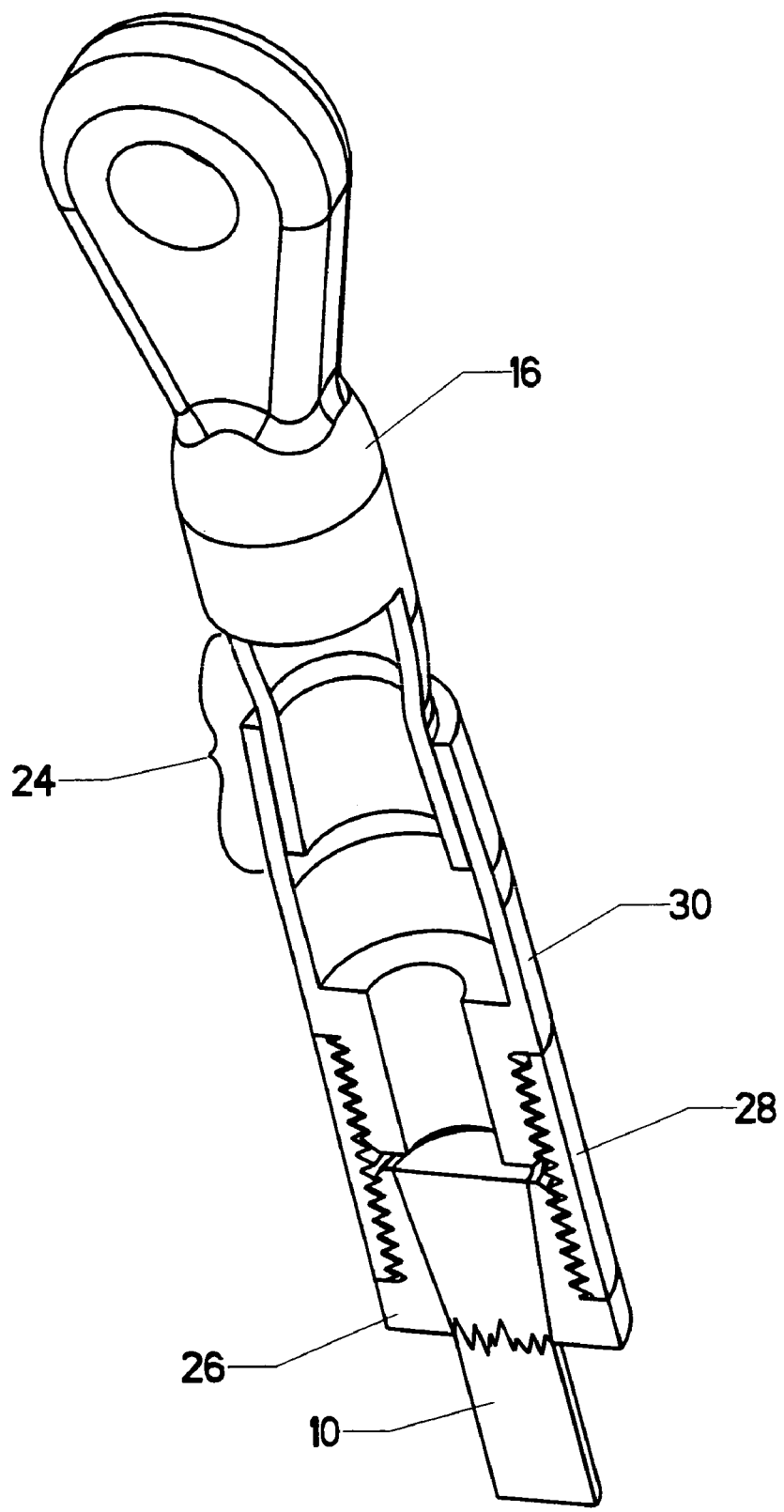
FIG. 12 is a partial section view, showing the assembly of FIG. 11.

FIG. 11 shows a completed assembly, ready for use. FIG. 12 is a partial section view of the same assembly, showing internal details. Cable 10 is locked into male threaded anchor 26. Threaded coupler 28 joins male threaded anchor 26 to swaging coupler 30. Swaging coupler 30 is connected to standard rigging fixture 16 by a swaged connection (swaged region 24).

Figure 3:
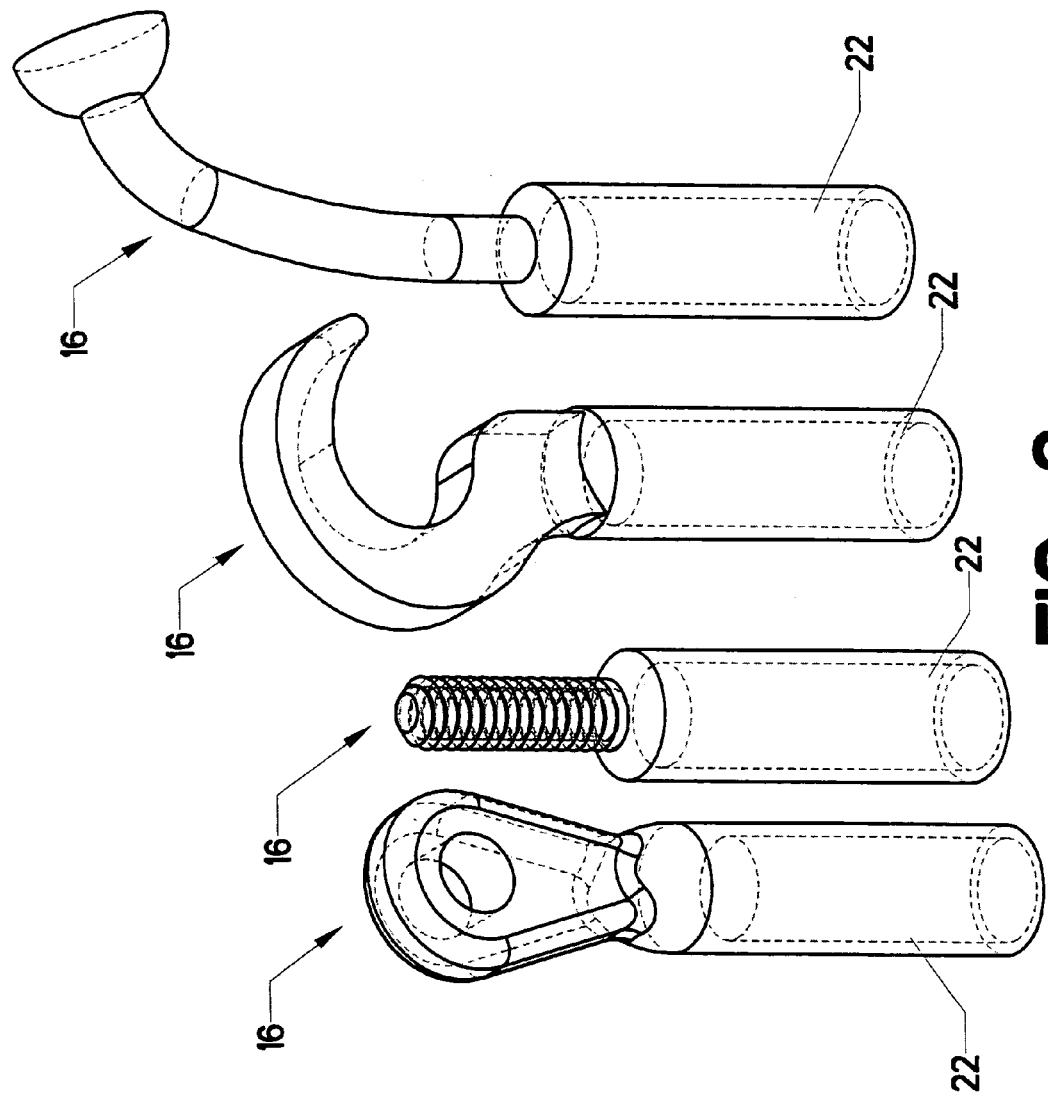
FIG. 3 is a perspective view, showing an assortment of prior art rigging fixtures.

The assembly shown in FIG. 12 could be created by combining two subassemblies. A cable is terminated by providing a male threaded anchor 26 (the first subassembly). A standard rigging fixture 16 is prepared by swaging it to a swaging coupler 30 (the second subassembly). When a completed cable assembly is needed, the manufacturer then connects the first subassembly to the second subassembly with threaded coupler 28. The reader should bear in mind that the cable manufacturer would typically have a variety of standard rigging fixtures on hand (such as the four shown in FIG. 3). Although an "eye" type fixture is shown in most of the drawings, virtually any prior art fixture can be used. Thus, the manufacturer gains the flexibility of using the variety of available prior art rigging fixtures.

Figure 13:
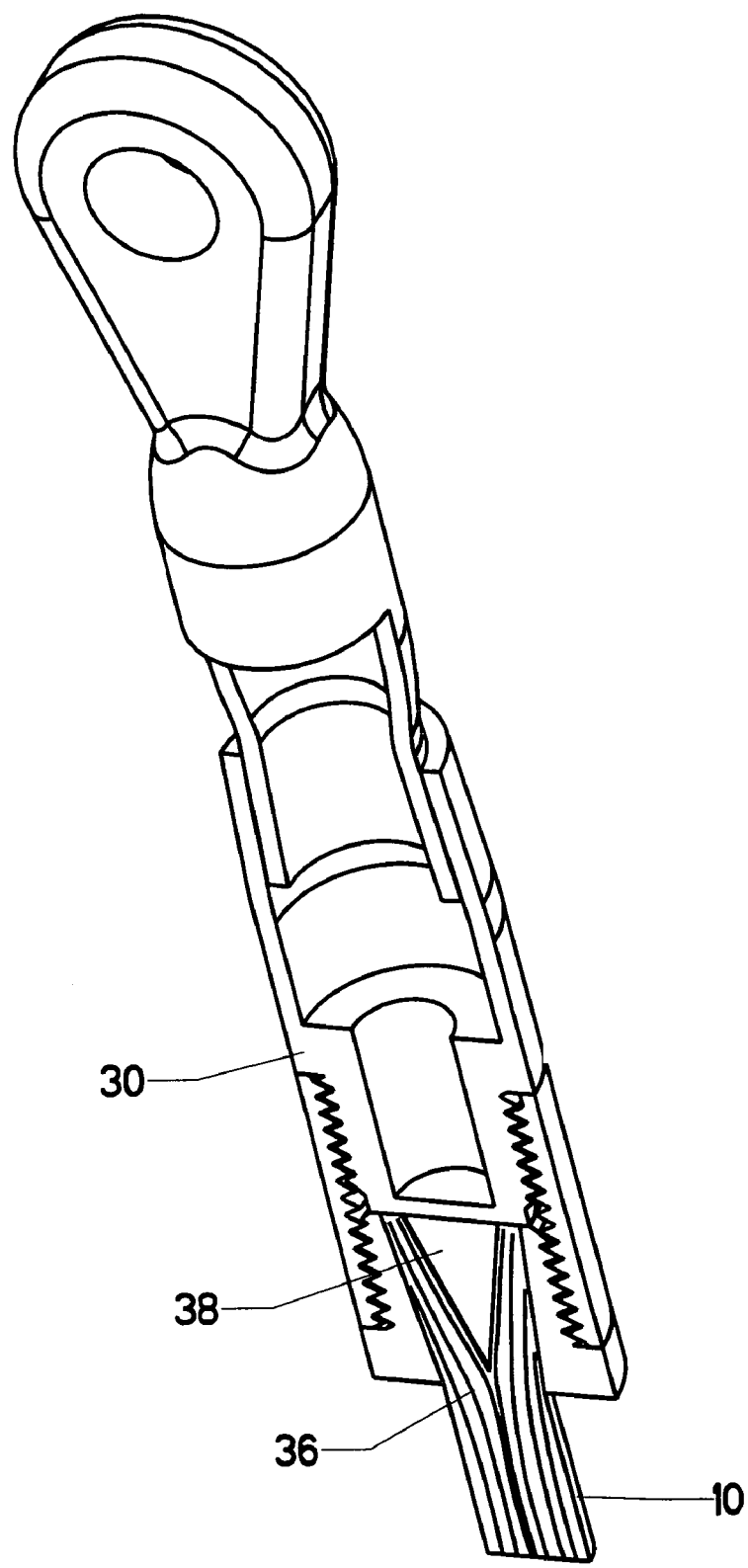
FIG. 13 is a partial section view, showing the use of a "spike and cone" termination in place of a potted termination.

Although a potted termination has been illustrated in FIGS. 4-12, the reader should not think of the invention as being limited to this type of connection between the anchor and the cable. The invention can be applied to any termination connected to the end of a cable, however the connection is made. As a second example, FIG. 13 (another partial section view) shows a "spike and cone" type termination. In this embodiment, swaging coupler 30 is provided with spike 38 which protrudes into the expanding cavity within the anchor when the components are assembled. Spike 38 compresses strands 36 between the spike and the surrounding cavity wall within the anchor. The strands are thus mechanically gripped and the anchor is secured to the end of the cable by mechanical friction alone. The balance of the assembly shown in FIG. 13 is identical to the one shown in FIGS. 11 and 12. A swaging sleeve is present and it has been swaged over a portion of the standard rigging fixture to create a swaged joint.

Figure 28:
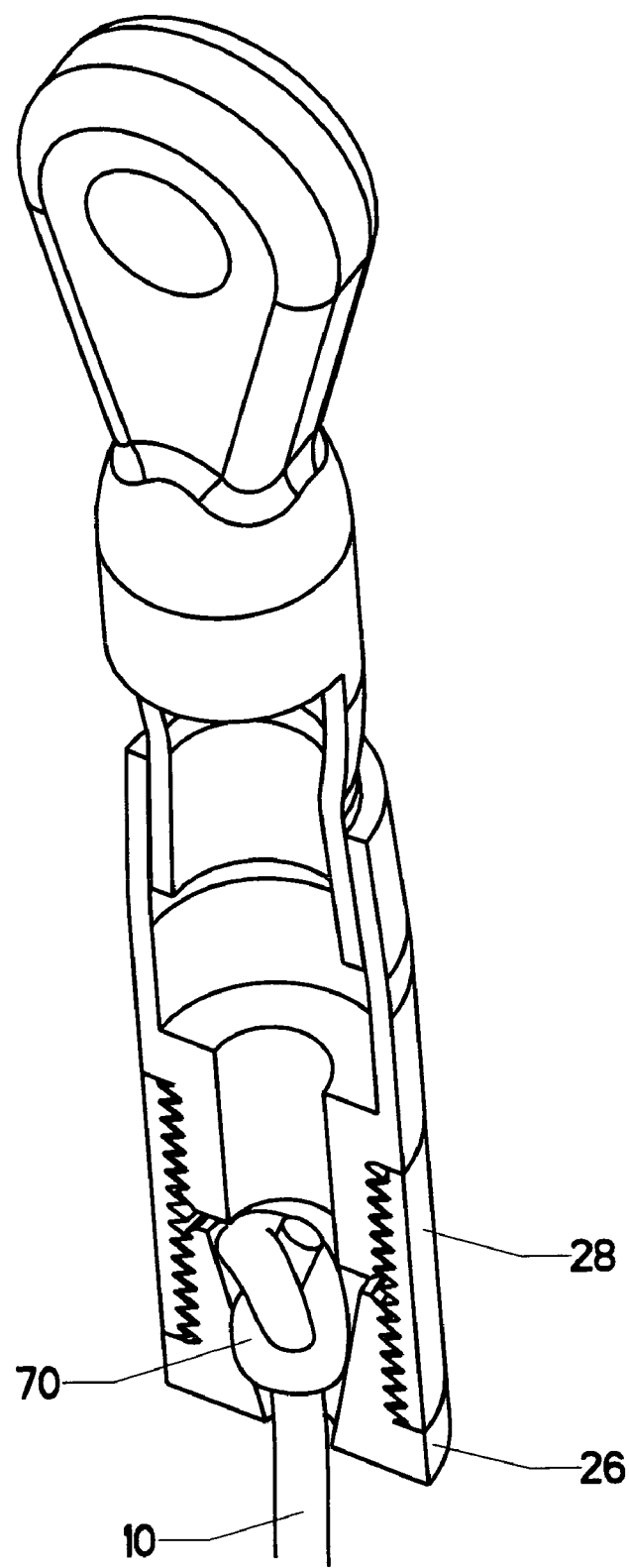
FIG. 28 is a partial section view, showing a different type of termination in combination with a swaging coupler.

FIG. 28 shows a connection made between the cable and the anchor by forming knot 70 inside the tapered cavity within male threaded anchor 26. The knot is too large to pass through the opening in the anchor, thus locking the two components together.

Figure 29:
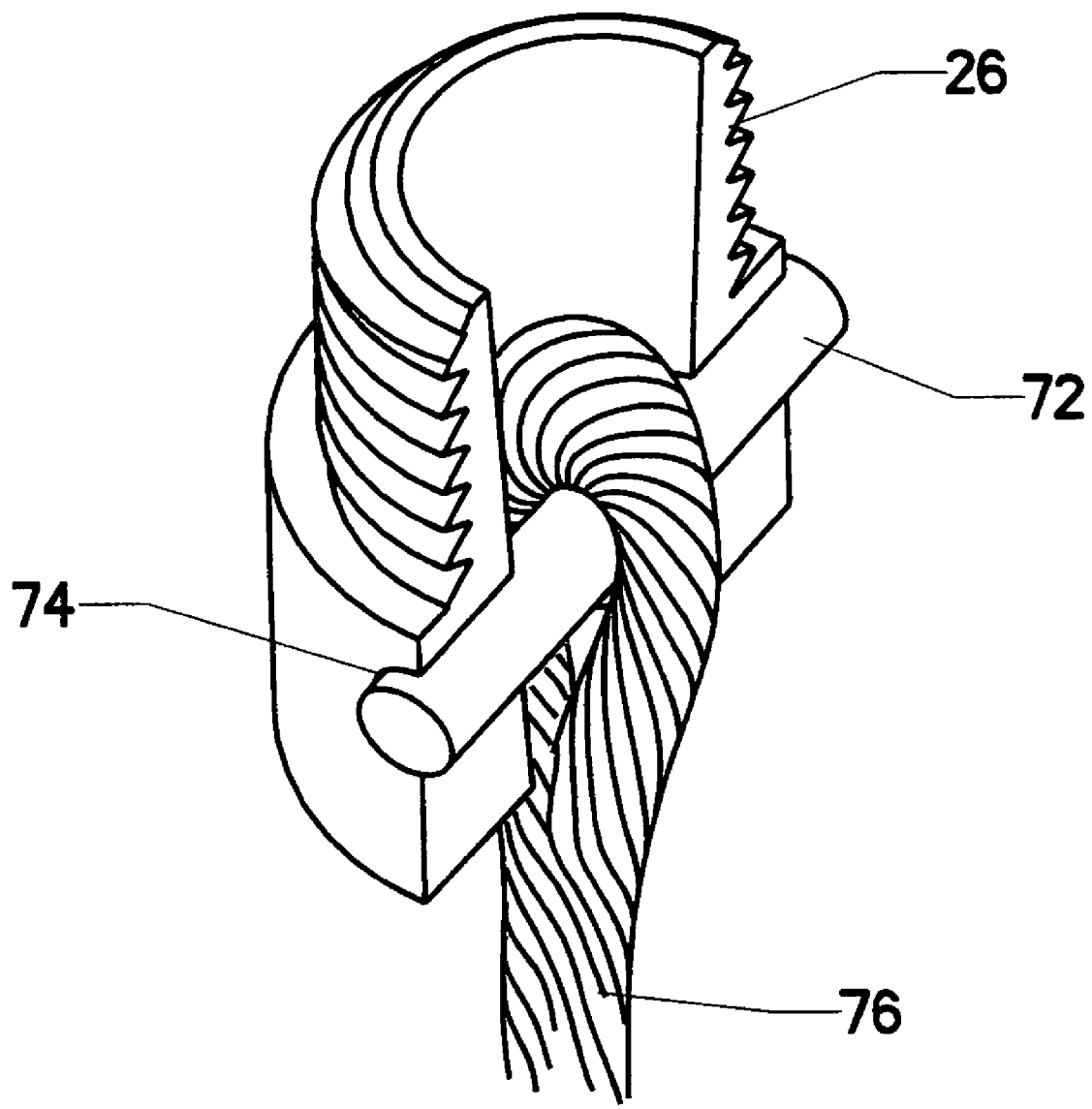
FIG. 29 is a partial section view, showing a different type of termination in combination with a swaging coupler.

FIG. 29 shows still another approach. A transverse hole 74 is provided through the anchor. Cross pin 72 is placed in this hole. A length of cable is then wrapped around the cross pin and back on itself. The overlapping portion is then woven into the cable to create interwoven section 76. The creation of an interwoven portion—which is well known in the art of cables—allows the transmission of tension from the cable, through the cross pin, and to the anchor. The reader will therefore appreciate that there are many different ways to attach a cable to an anchor.

Figure 14:
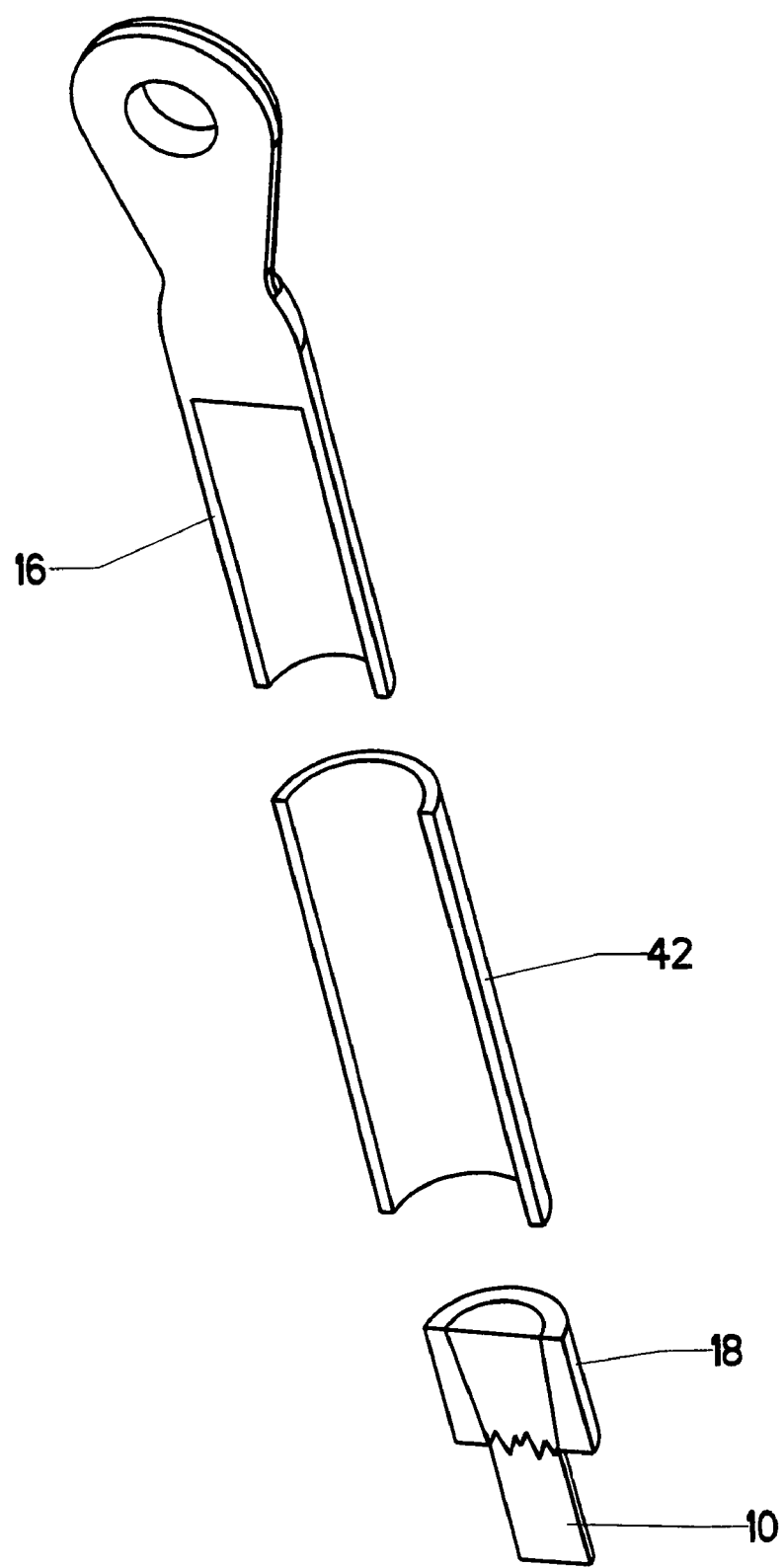
FIG. 14 is an exploded section view, showing a different type of swaging coupler.

The reader will also appreciate that there are many different ways to attach a suitable swaging sleeve to an anchor. FIG. 14 shows an alternate embodiment in a section view. A prior art anchor 18 is attached to the end of cable 10 by any suitable means. Swaging coupler 42 is sized to slide closely over anchor 18 and standard rigging fixture 16.

Figure 15:
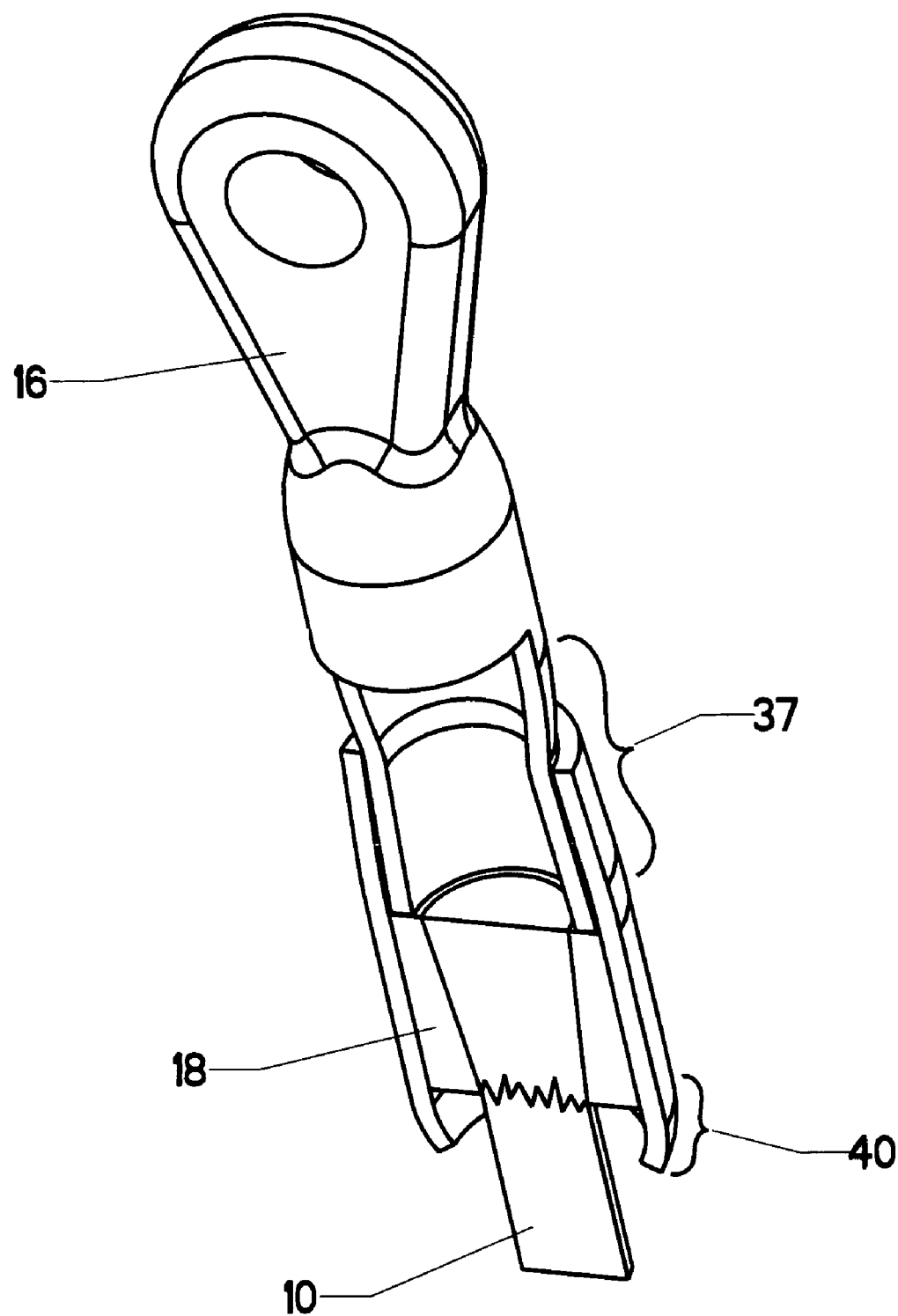
FIG. 15 is a partial section view, showing the components of FIG. 14 in an assembled state.

Once in place, two swaging operations are carried out to connect the standard rigging fixture to the anchor. FIG. 15 is a partial section view of the completed assembly. Anchor swage 40 is formed to lock one end of the swaging coupler over the anchor. Swaged region 37 is formed to lock the other end over the standard rigging fixture. The completed assembly is able to withstand substantial tensile force. The reader should bear in mind that each of the swaging operations (anchor swage or fixture swage) may in fact include multiple steps. As previously described, the formation of a uniform swaged joint may require two or more clamping cycles in a swaging die, with rotation between each cycle.

Figure 30:
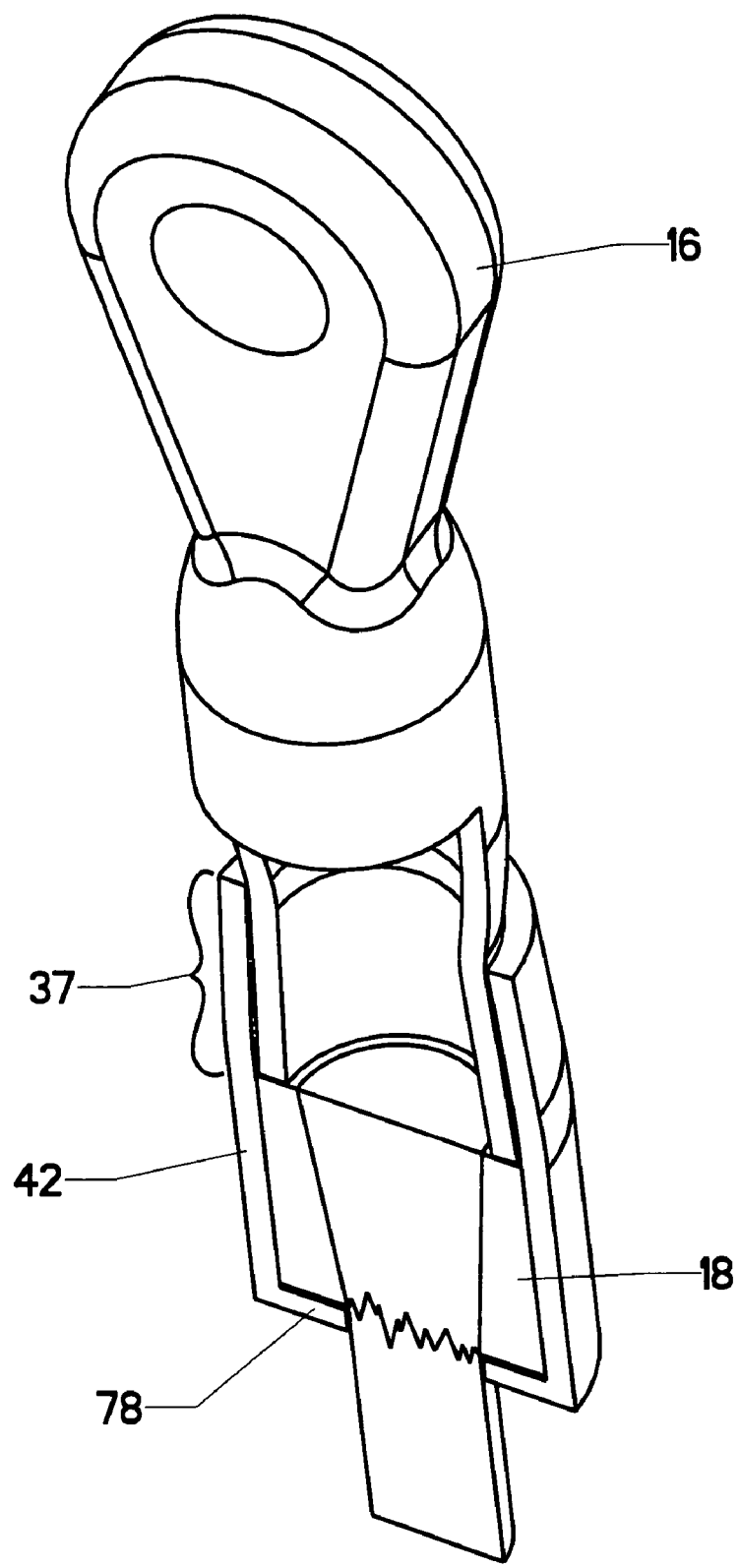
FIG. 30 is a partial section view, showing a different type of connection between the swaging sleeve and the anchor.

The swaging sleeve can also be modified to eliminate the need for anchor swage 40. FIG. 30 shows a different approach for attaching the swaging coupler to the anchor. In this embodiment, swaging coupler 42 is provided with an integral anchor seat 78. This feature lies beneath the anchor (with respect to the orientation shown in the view) and captures it once swaged region 37 is formed. Thus, there is no need for a second swaging operation to swage a portion of the coupler over the anchor itself.

Figure 16:
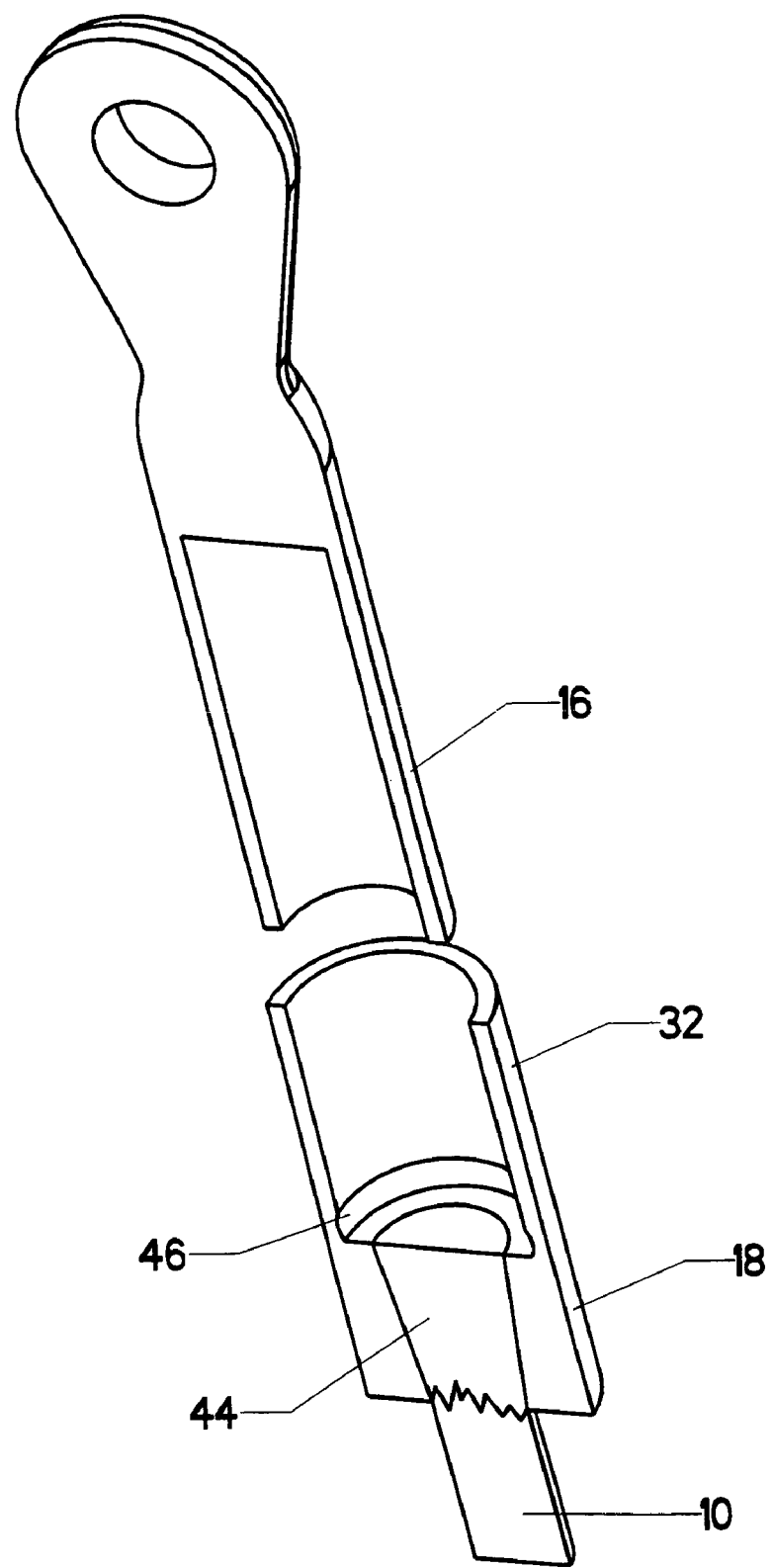
FIG. 16 is a section view, showing the addition of a swaging sleeve to the anchor itself.
Figure 17:
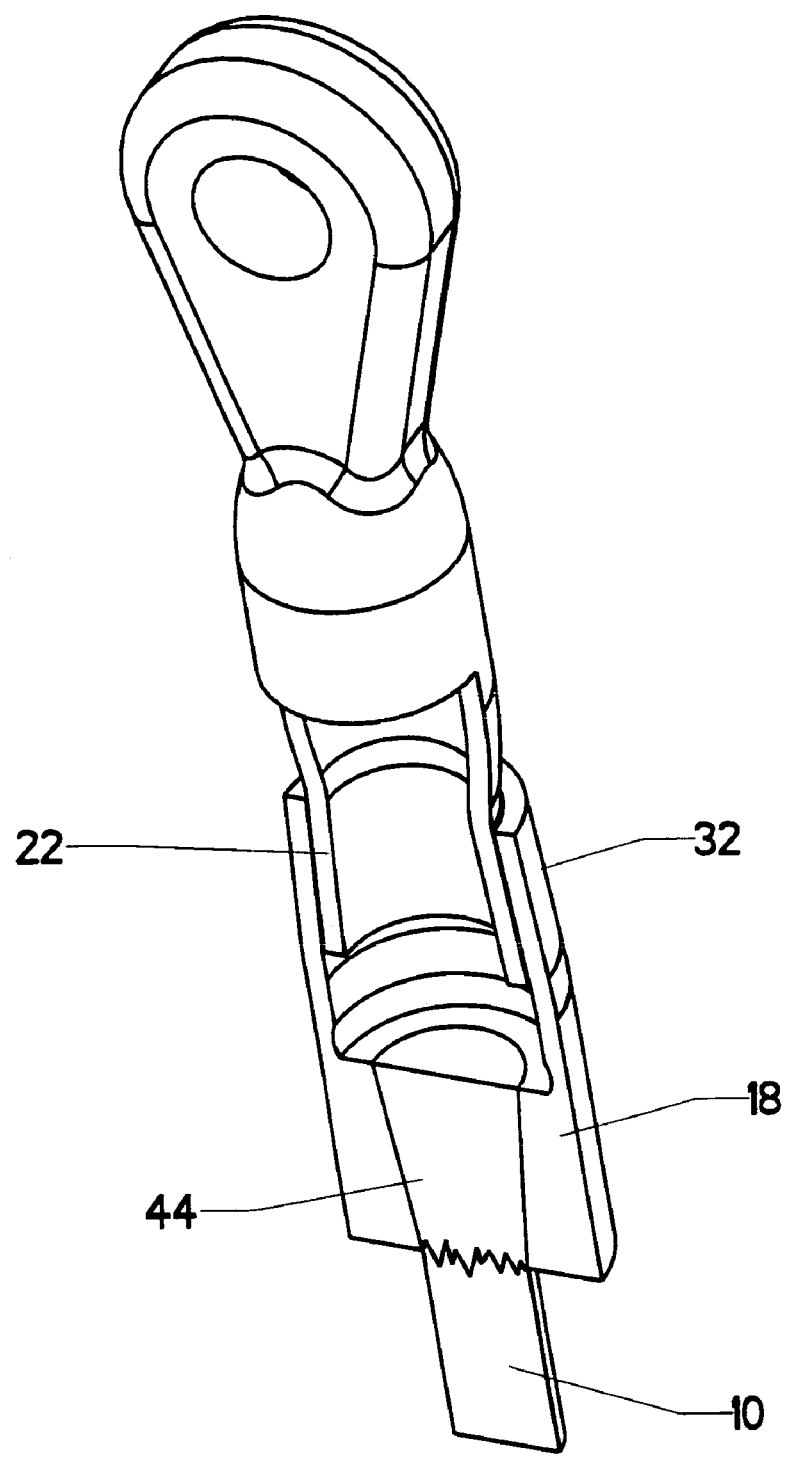
FIG. 17 is a partial section view, showing the components of FIG. 16 in an assembled state.

Of course, a swaging sleeve can be "attached" to an anchor by making the swaging sleeve part of the anchor itself. FIG. 16 shows such an embodiment in a section view. Anchor 18 includes swaging sleeve 32 as an integral feature. Relief 46 can be provided so that the compressive forces inherent in the swaging operation will not be transmitted to potted region 44 (Such forces might fracture and weaken the potted region). The swaging sleeve on the anchor is swaged over a portion of a standard rigging fixture, as shown in FIG. 17 (a partial section view). The standard rigging fixture is thus attached to the anchor using a feature integral to the anchor itself.

Figure 18:
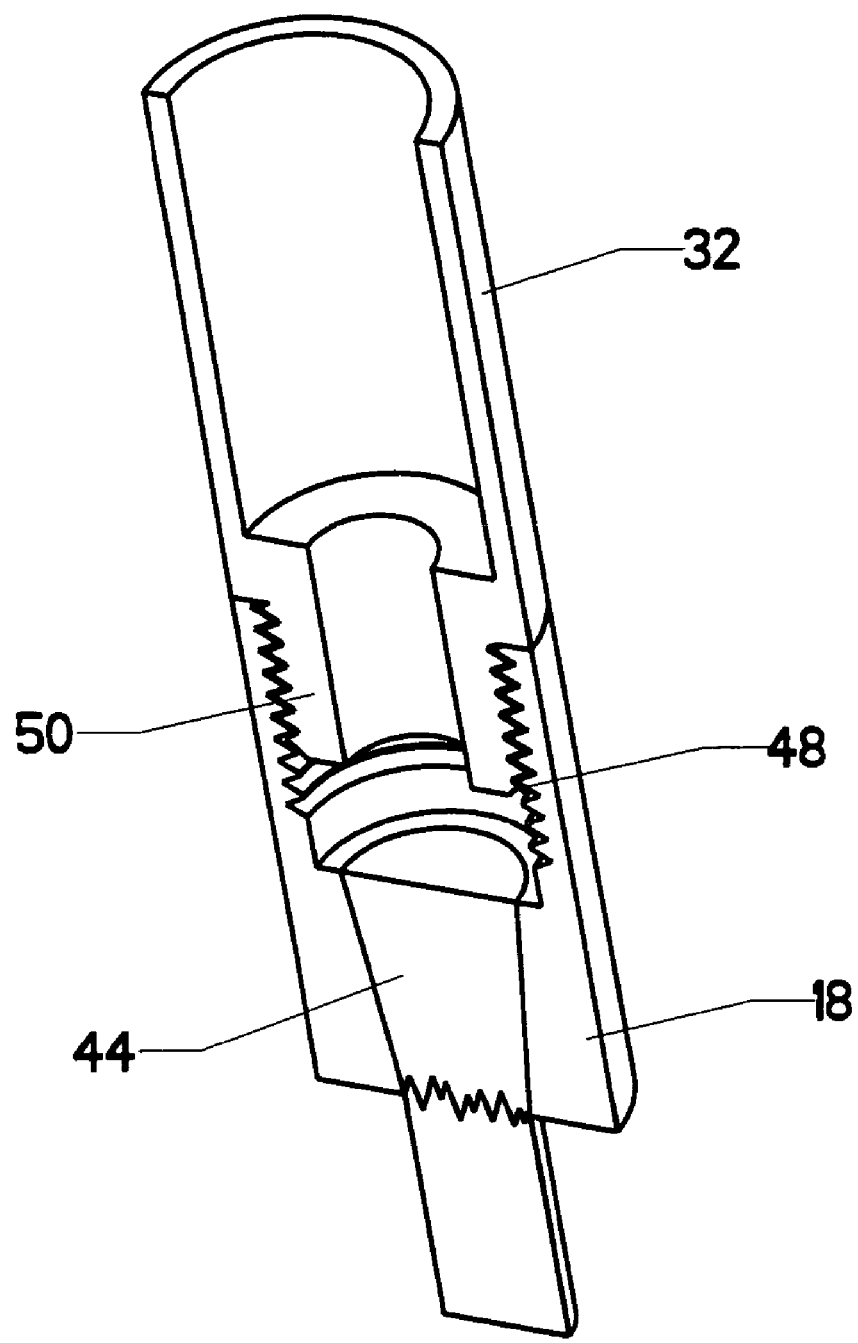
FIG. 18 is a section view, showing a threaded connection of a swaging sleeve to an anchor.

FIG. 18 shows still another approach. The anchor is provided with a portion containing female thread 48. Swaging sleeve 32 is provided with a threaded shank 50. The threaded shank is screwed into the female thread on the anchor. Swaging sleeve 32 is swaged onto a standard rigging fixture as described previously.

Figure 1:
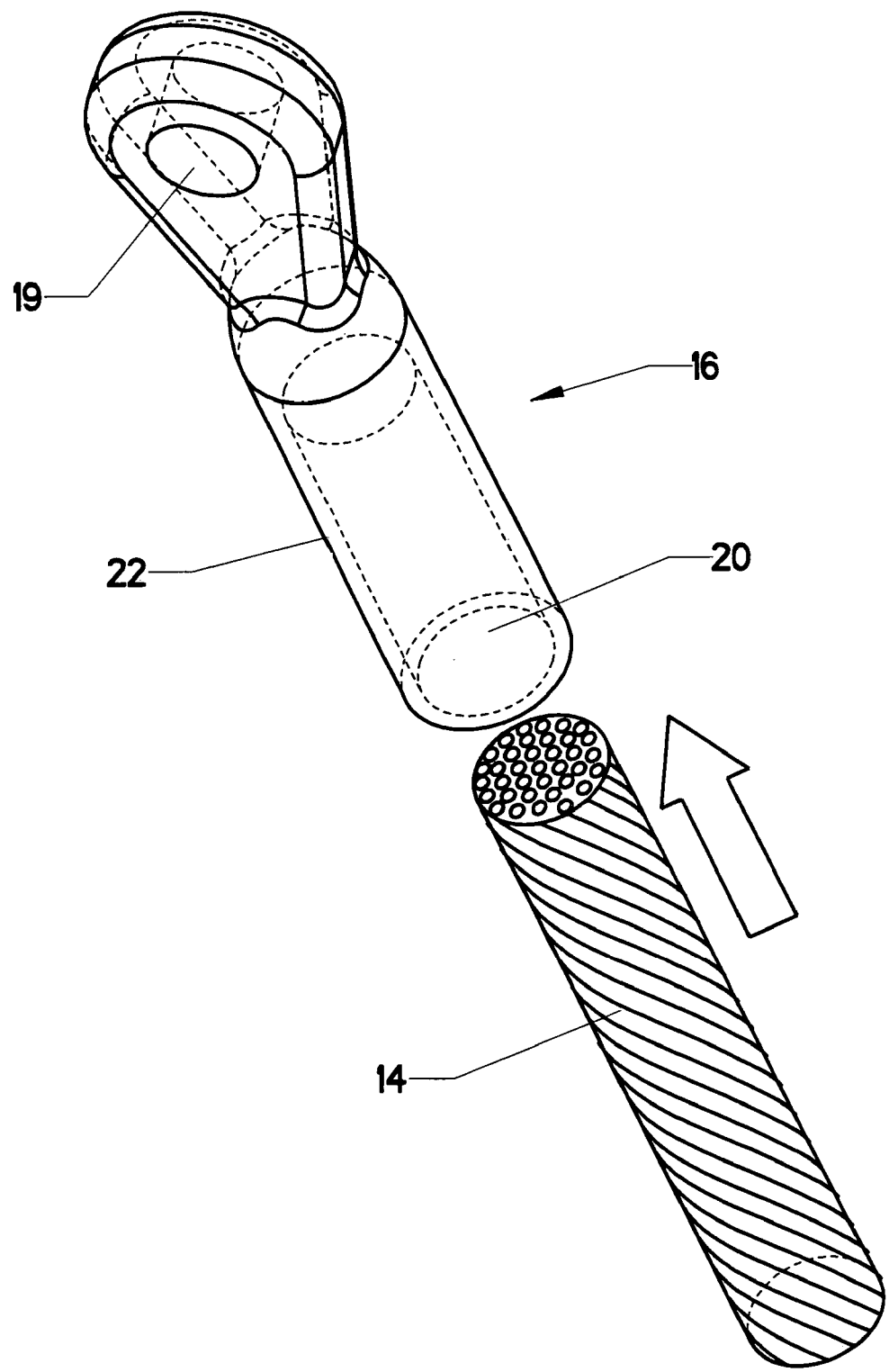
FIG. 1 is a perspective view showing a prior art rigging fixture.
Figure 2:
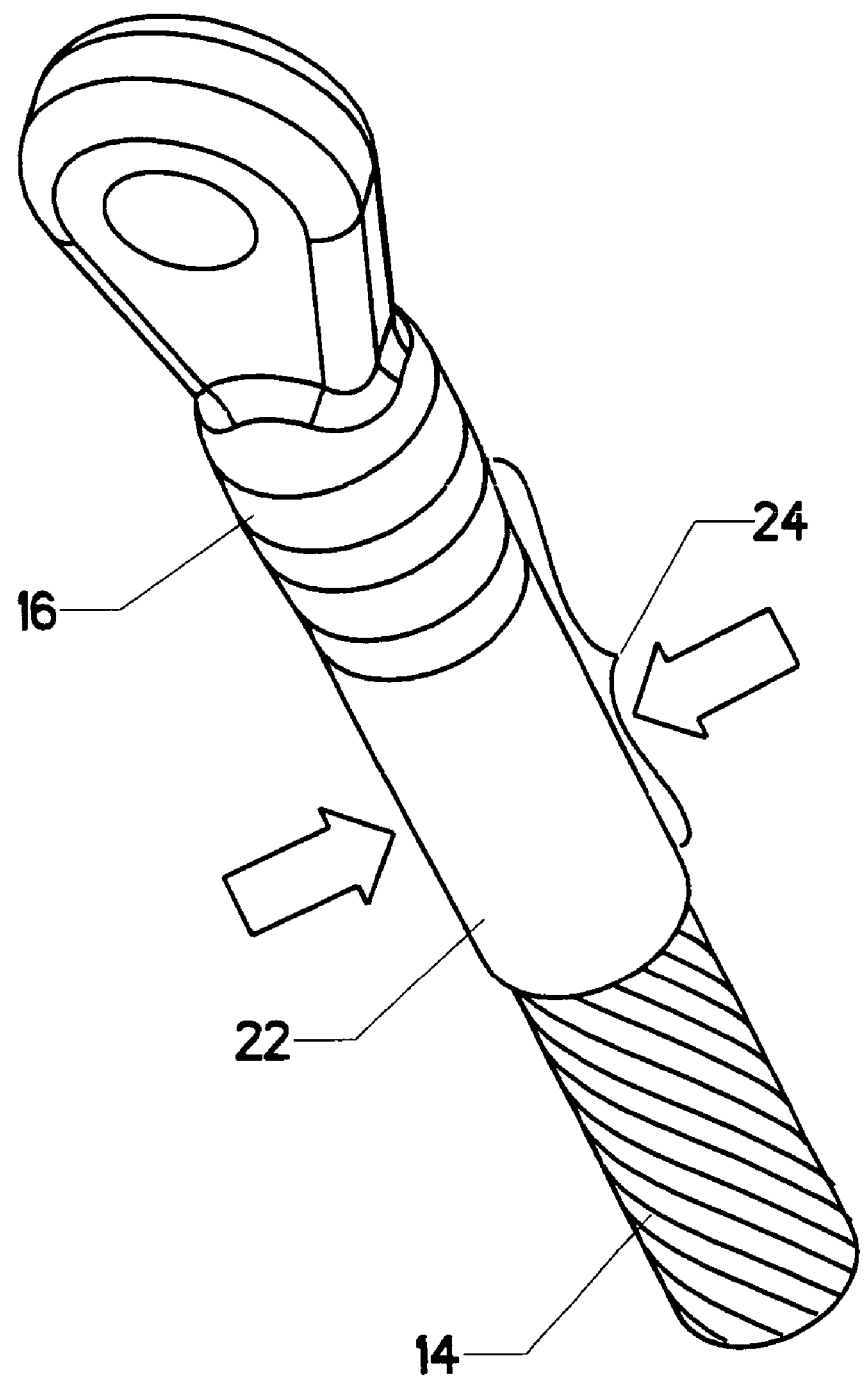
FIG. 2 is a perspective view showing the attachment of the prior art rigging fixture to a wire rope.

Returning briefly to FIG. 1, the reader will recall that standard rigging fixture 16 is provided with socket 20 surrounded by a wall defining swaging surface 22. If the standard rigging fixture is to be used as described herein, those skilled in the art will realize that socket 20 is not strictly necessary. It can be omitted. Since many of the standard rigging fixtures are machined, the elimination of the socket means the elimination of a machining step. Thus, eliminating the socket reduces cost.

Figure 19:
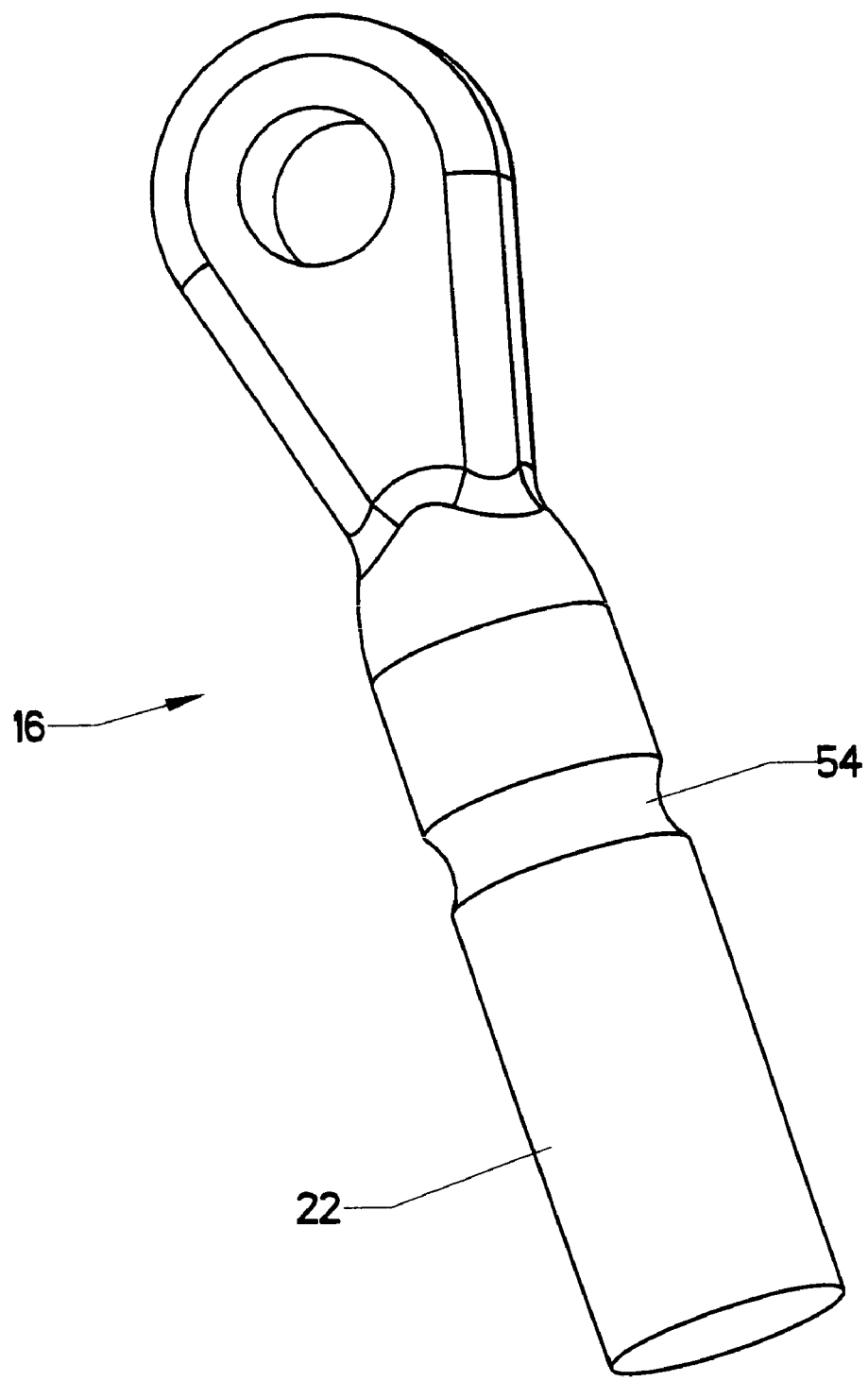
FIG. 19 is a perspective view, showing an alternate embodiment of a prior art rigging fixture.

FIG. 19 shows a standard rigging fixture with the socket eliminated. It still has a swaging surface 22, but in this version the fixture is not hollow. A standard rigging fixture thus modified can still be joined with a swaging operation using a straight-walled swage as shown in FIG. 10. Of course, being solid, the swaging surface on a rigging fixture as shown in FIG. 19 will not deform as much as on a hollow fixture. Nevertheless, an effective straight-walled swage can still be made.

Figure 20:
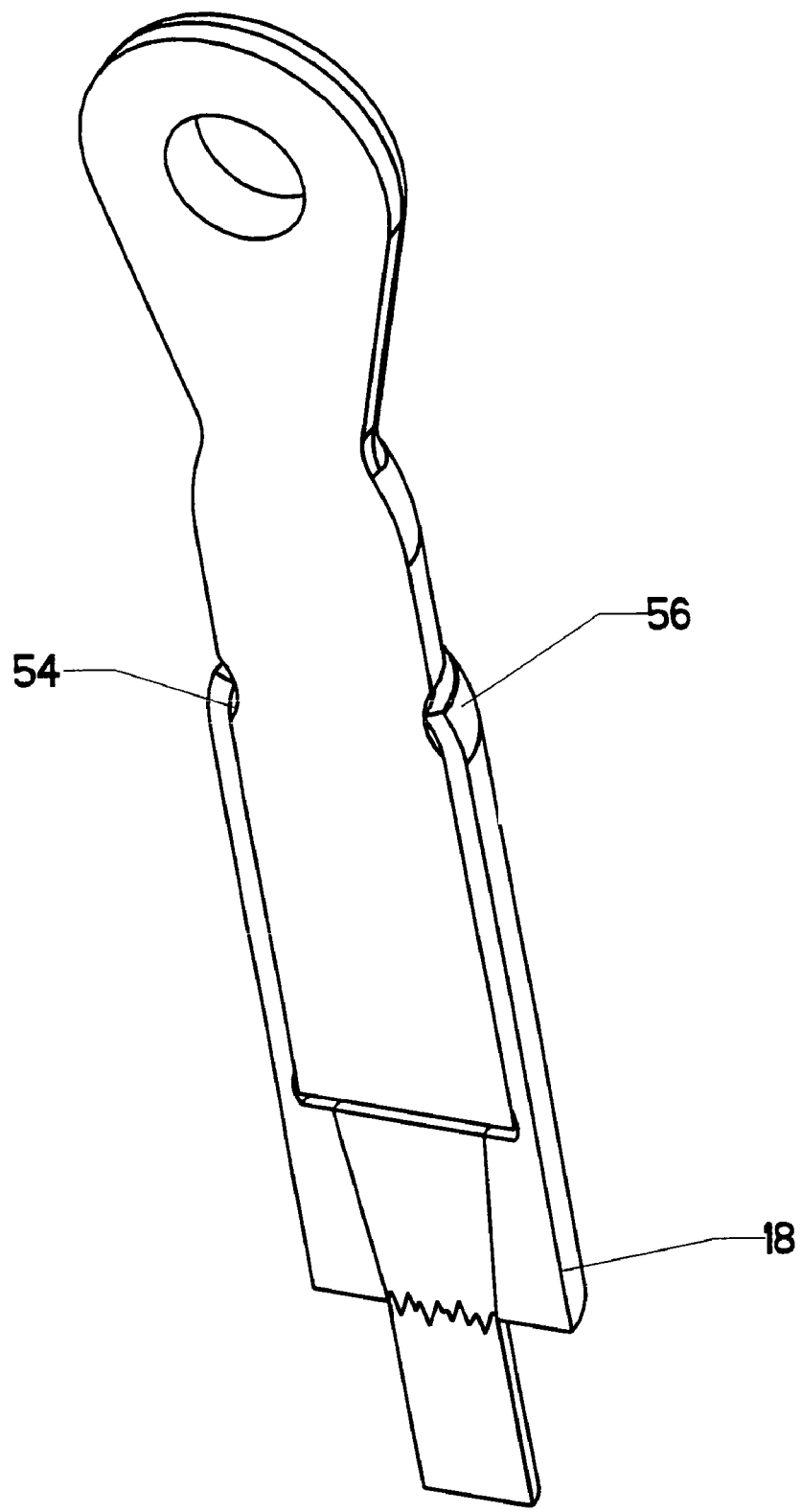
FIG. 20 is a section view, showing the rigging fixture of FIG. 19 attached by swaging.

Other features can be added to increase the strength of the swaged joint. Since most standard rigging fixtures are made with turning operations, a cannelure 54 can be cut into the exterior of swaging sleeve 22. The upper portion of the swaging sleeve attached to the anchor can then be swaged into this cannelure for extra strength. FIG. 20 shows a section view of an assembly thus completed. Swaged region 56 is deformed into cannelure 54, thus locking the standard rigging fixture to the anchor. The term "cannelure" is intended to encompass any shape of relief cut into the swaging surface, and could include a square-shouldered notch, a "vee" notch, etc. Some cannelures do not go all the way around the object. An example would be three interrupted sections. The swaged region is then pressed into these uninterrupted sections using a "hatchet chop" operation for each of the interrupted sections.

Figure 21:
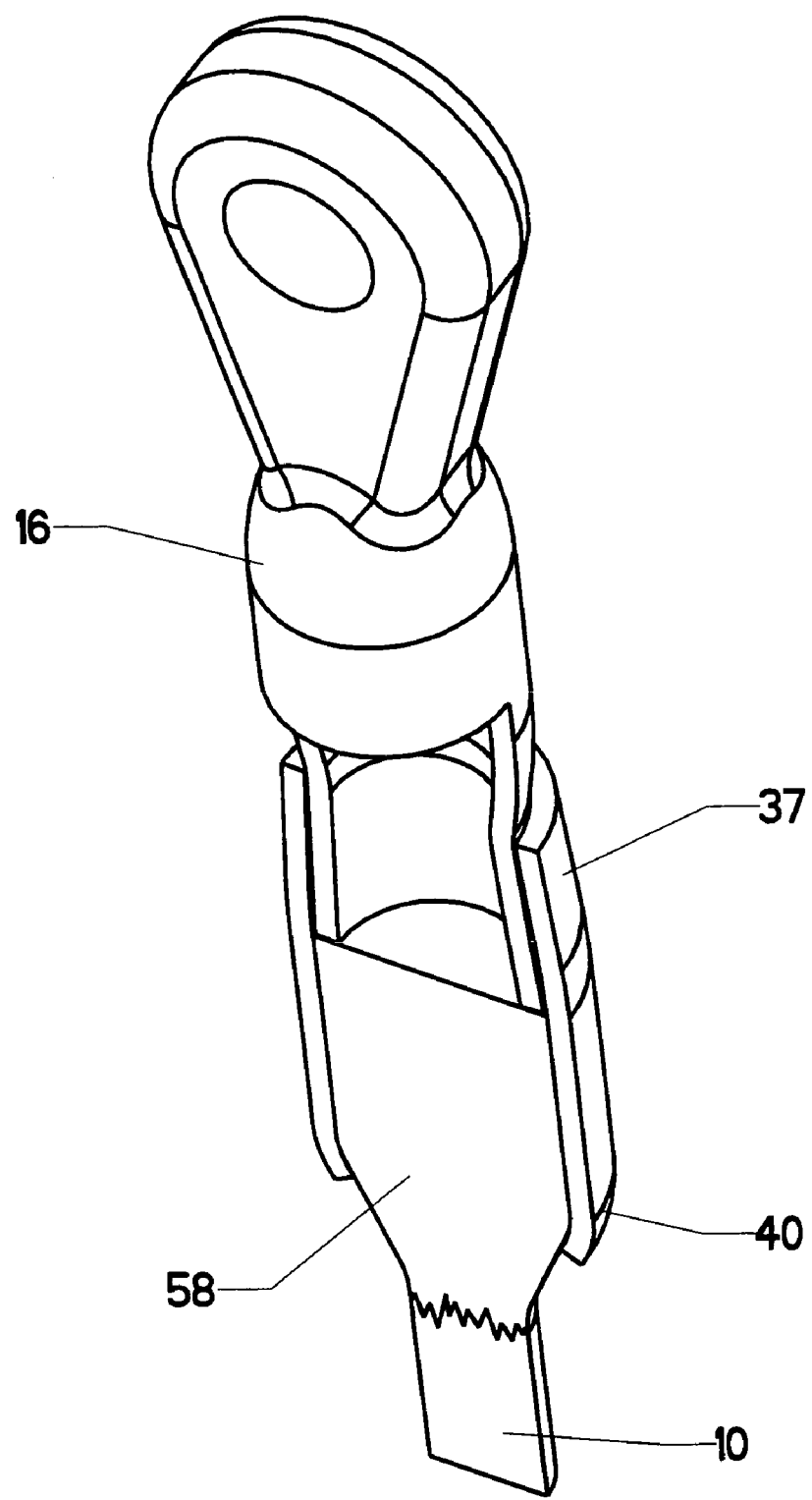
FIG. 21 is a partial section view, showing a swaging sleeve attached to a pre-molded termination.

Other variations are possible. Not all cable terminations feature a separate anchor. In some instances, the strands on a cable's end are clamped into a mold and liquid molding compound is injected around them. When the molding compound solidifies (typically via cooling or cross-linking), a solid molded portion is formed on the cable's end. FIG. 21 shows the result of this approach, with the solid portion being labeled as molded region 58. This molded region then becomes the anchor, without the need for any additional device.

A swaging coupler such as the one shown in FIG. 14 can then be used to connect a standard rigging fixture to the molded region. The completed assembly is shown as a partial section view in FIG. 21. Anchor swage 40 is actually formed over molded region 58. Fixture swage 38 is formed over the standard rigging fixture.

Figure 22:
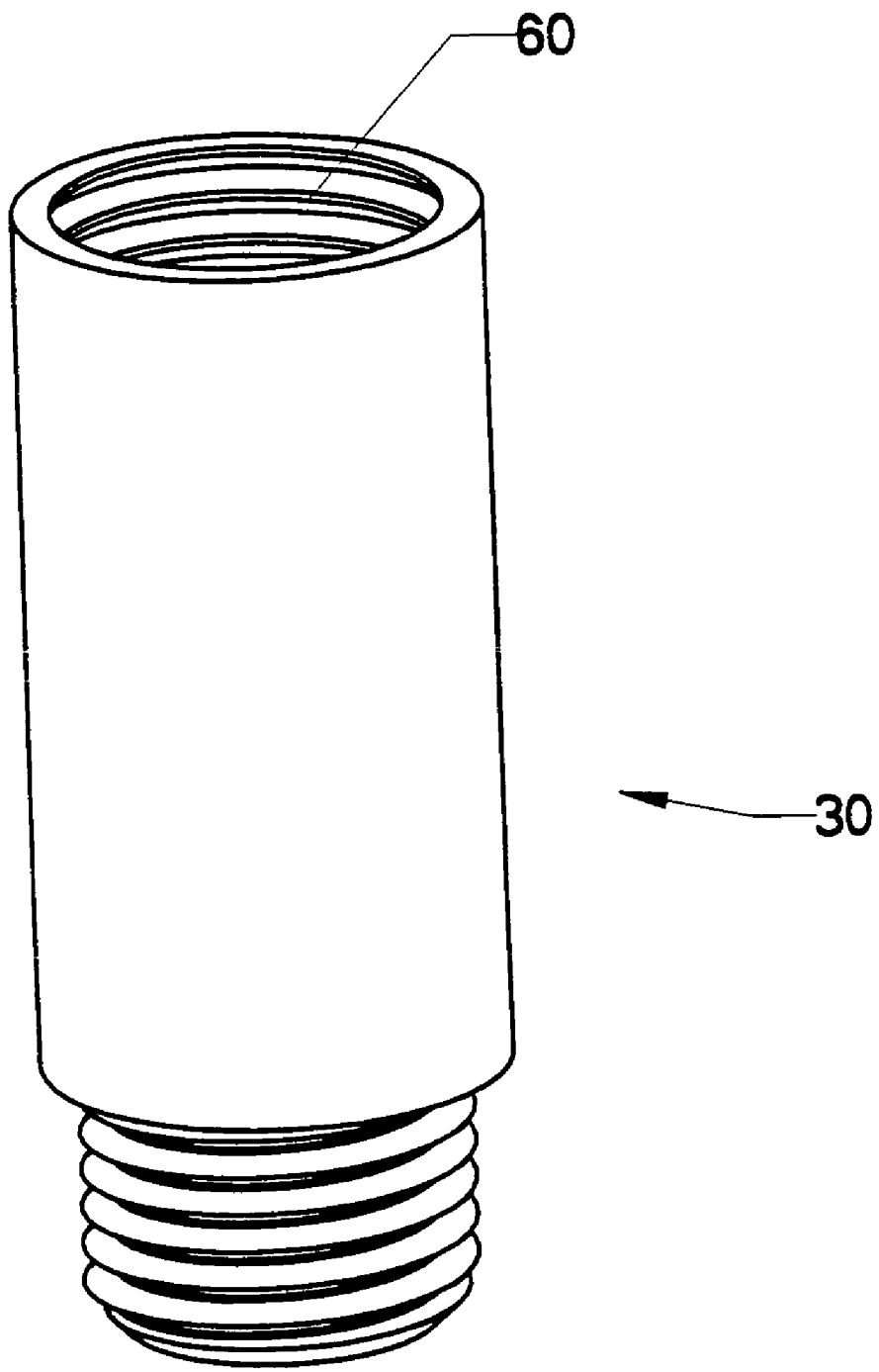
FIG. 22 is a perspective view, showing the addition of internal ribs to a swaging sleeve.

The swaged joints have been shown with smooth walls, but this need not always be the case. Those familiar with swaging will know that mechanical gripping features are sometimes added to enhance the strength of a swaged joint. FIG. 22 shows a swaging coupler 30 with a series of internal ribs 60 added to the internal surface of the swaging sleeve. These internal ribs can be a series of undulations. They could also be a simple screw thread, knurled pattern, or other known surface disturbance. When such a swaging sleeve is swaged over a smaller object, these features "bite" into the smaller object and strengthen the joint.

The devices thus disclosed can be used to attach a variety of useful prior art components to a termination on an end of a cable. The term "standard rigging fixture" is intended to encompass a very broad range of such components (much broader than those shown in FIG. 3). As one good example, it is often useful to have a simple threaded shaft attached to the end of a cable. Such a shaft can be passed through a hole. A nut and washer can then be attached, with the nut being tightened to draw the cable taut.

Figure 23:
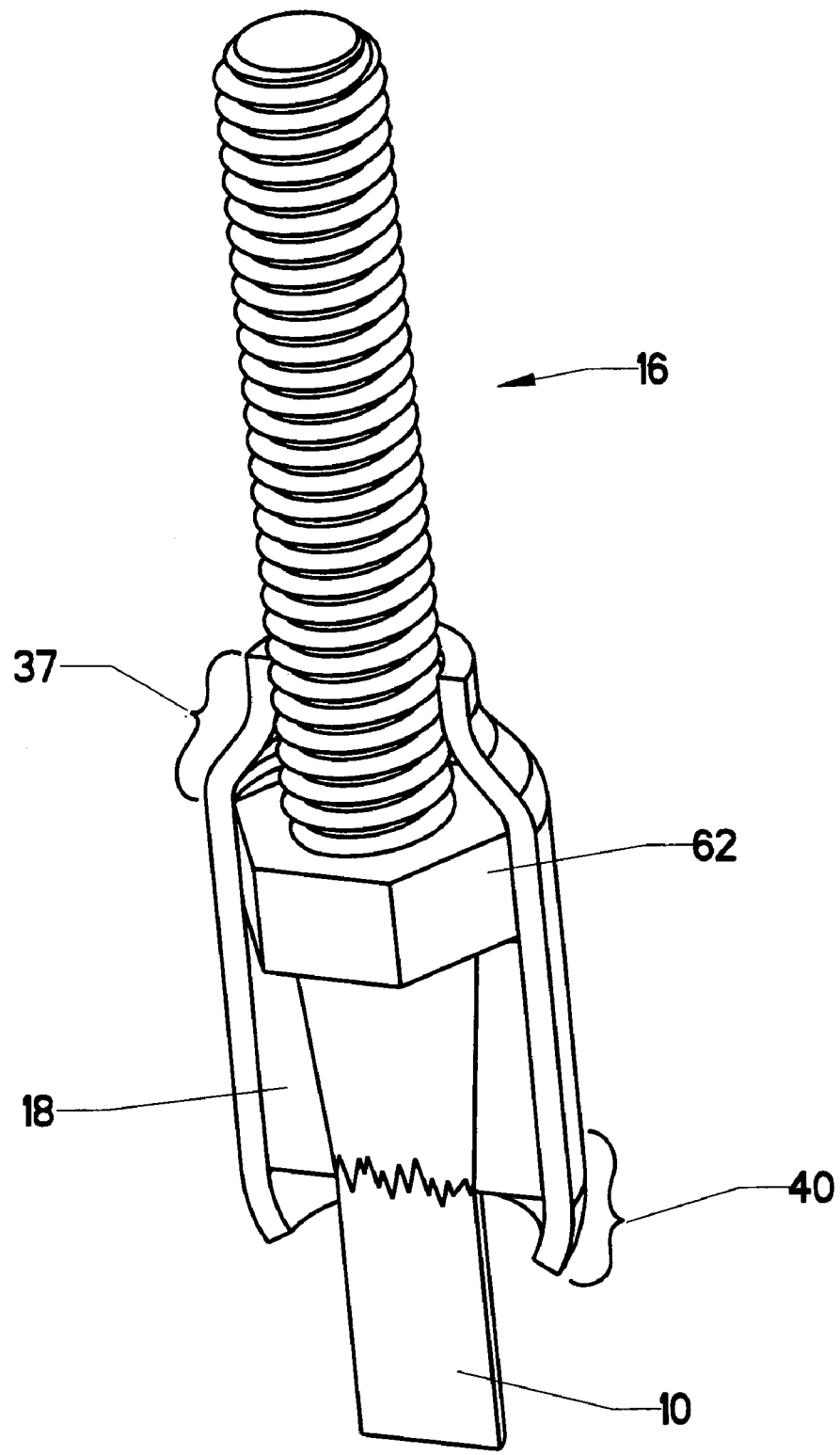
FIG. 23 is a partial section view, showing the use of a swaging sleeve to attach a bolt to an anchor.

FIG. 23 shows the use of a swaging coupler to attach a simple bolt to an anchor. The bolt has enlarged portion 62 (a hexagonal head) which facilitates the swaging operation. As before, anchor swage 40 locks one end over the anchor, while swaged region 37 in this case locks over the bolt head and a portion of the threads. A similar swaging operation could be used to attach a piece of threaded rod without a head. A bolt or a threaded rod is within the scope of the term "prior art rigging fixture."

Figure 24:
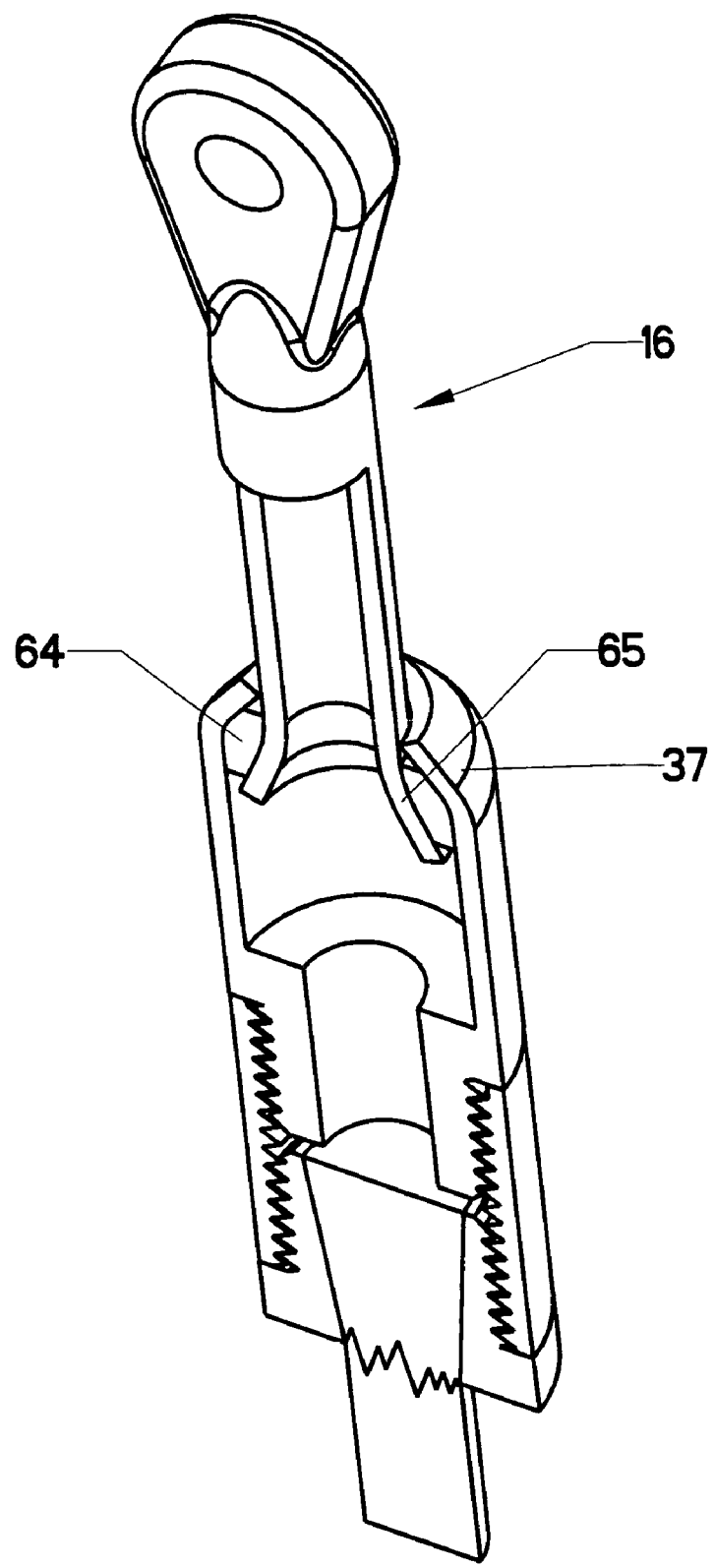
FIG. 24 is a partial section view, showing the use of a spacer to accommodate a swaging sleeve and rigging fixture of different size.

Other simple components can be added to enhance the swaged connections. FIG. 24 shows a swaging coupler that is too large to secure the standard rigging fixture shown. This size mismatch can be accommodated using an annular spacer 64. First, spacer 64 is placed over the lower end (with respect to the orientation shown in the view) of the rigging fixture. The lower end is then deformed to form flared base 65. The flared base and spacer are then placed in the open mouth of the swaging coupler, which is formed into swaged region 37. The components are thus locked together.

Figure 25:
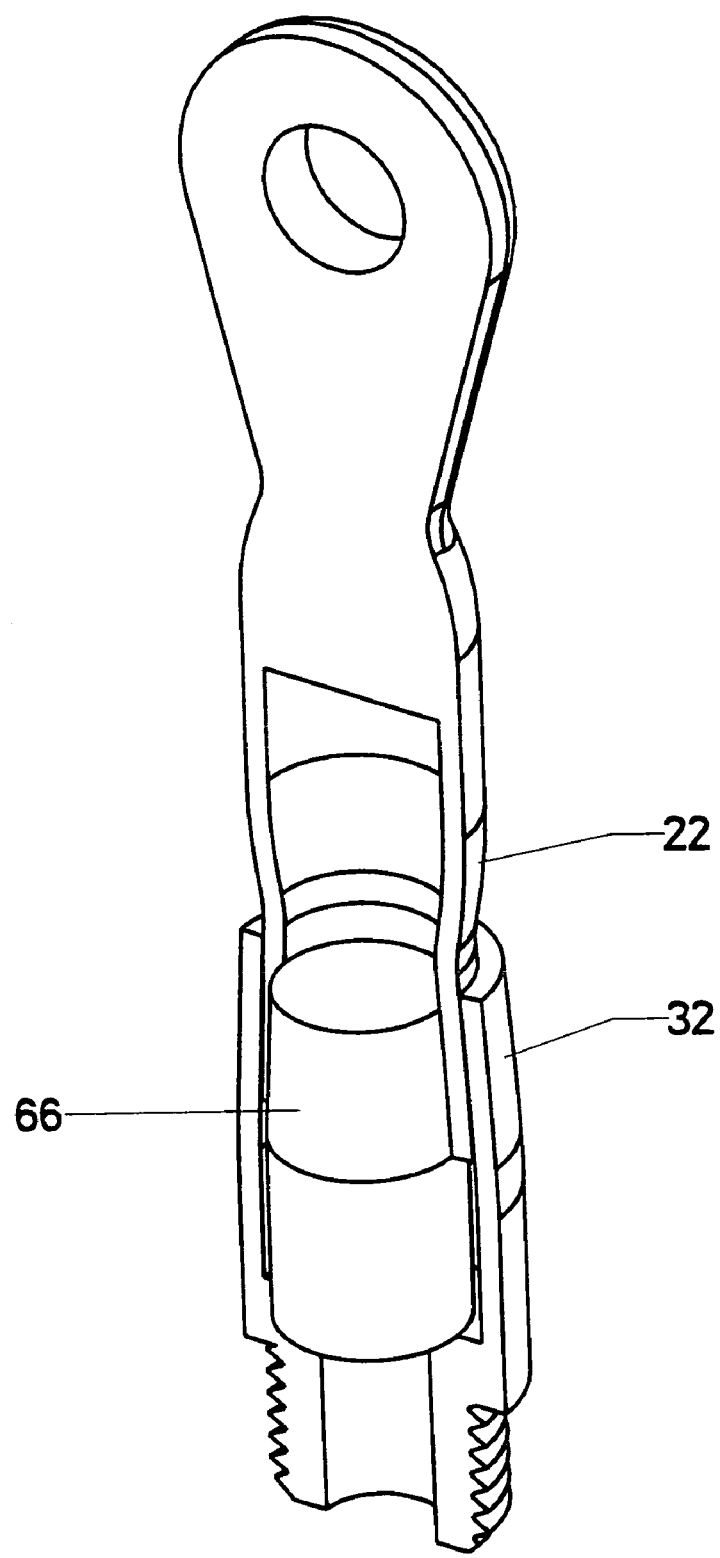
FIG. 25 is a partial section view, showing the use of a plug to reinforce a swaged connection.

Other internal components can be added to reinforce the swaged joint. Returning to FIG. 12, the reader will realize that the swaged joint will often fail by the wall of the rigging fixture deforming further inward (allowing it to slide free of the swaging coupler). In FIG. 25, reinforcing plug 66 has been added prior to the swaging operation. This plug is made of a relatively stiff material, so that inward deflection of the wall of the rigging fixture is resisted. The plug can also be modified to extend upward into the standard rigging fixture.

Figure 26:
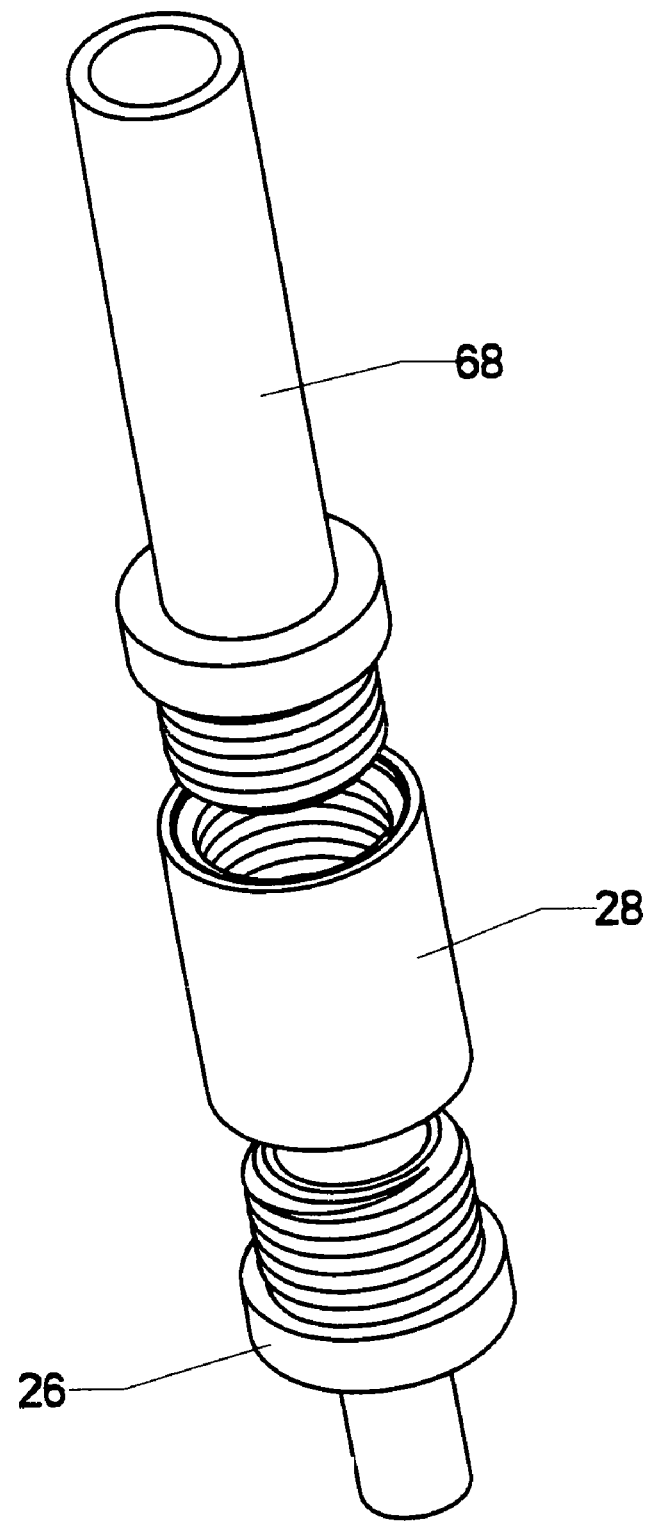
FIG. 26 is a perspective view showing an internal swaging sleeve.
Figure 27:
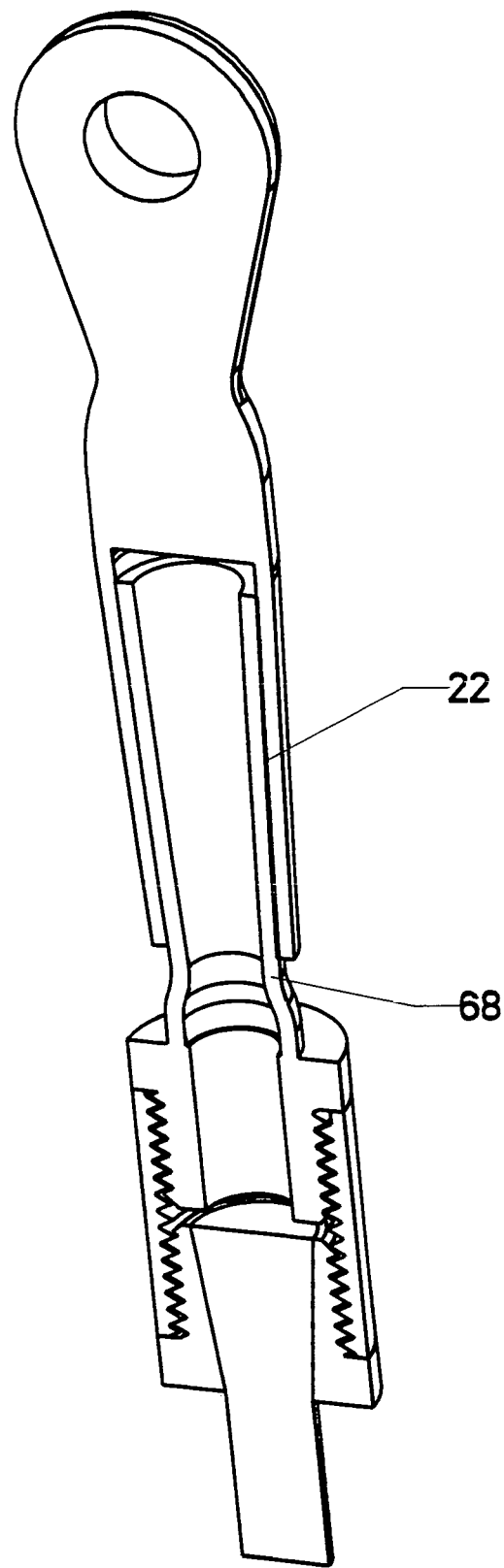
FIG. 27 is a section view, showing a completed assembly using the internal swaging sleeve.

The preceding drawing views have depicted a larger swaging sleeve on a swaging coupler sliding over a smaller swaging surface on a standard rigging fixture. Of course, a swaged joint can be formed in the opposite way. FIG. 26 shows a coupler having a much smaller swaging sleeve, denoted as internal swaging sleeve 68. In FIG. 27 (another section view), a swaged joint has been created by sliding internal swaging sleeve 68 inside swaging surface 22 on the rigging fixture (in this case an internal surface of a hollow fixture), then swaging the two into a tapered interface.

Figure 31:
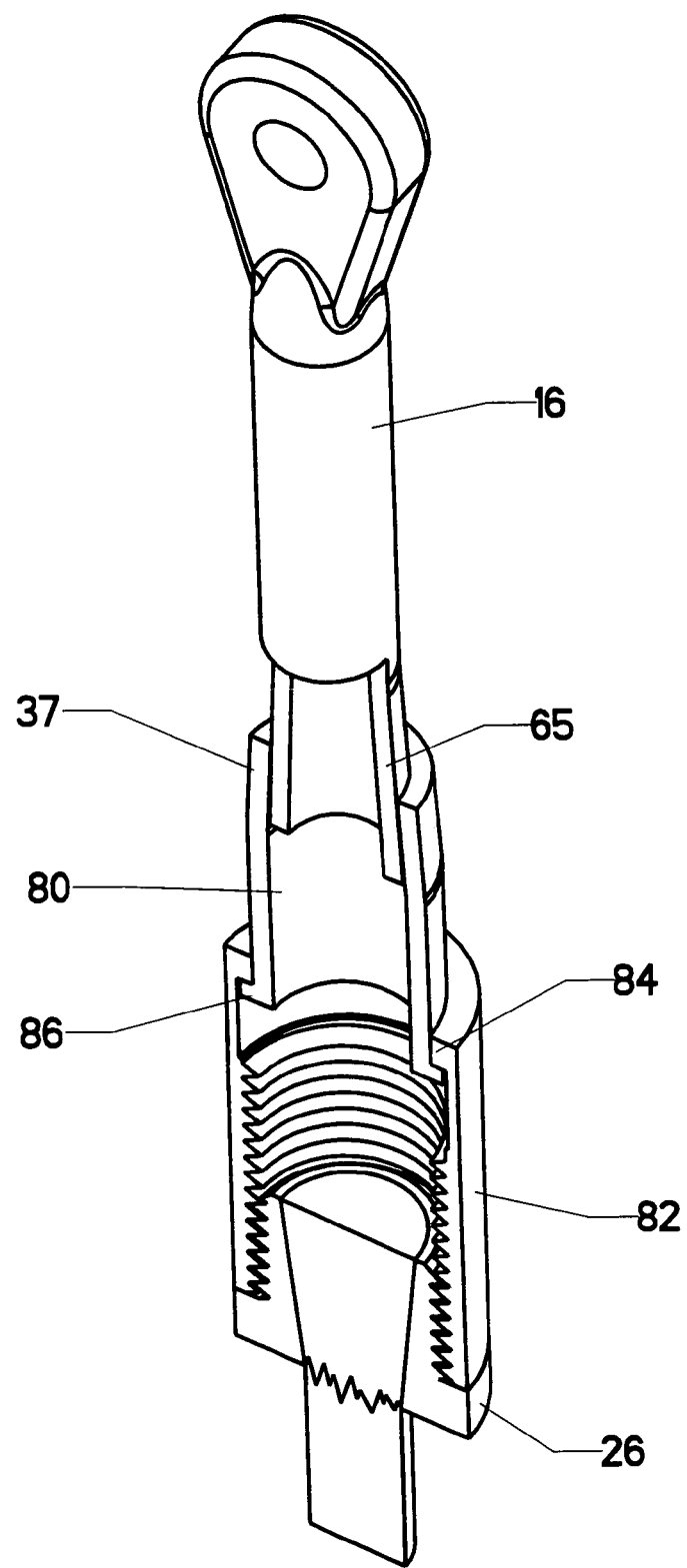
FIG. 31 is a partial section view, showing the use of a flanged swaging sleeve.

FIG. 31 shows yet another approach for connecting the swaging coupler to the anchor. Threaded coupler 82 is provided with threads for attachment to male threaded anchor 26. Threaded coupler 82 is also provided with overhang 84. This overhang captures flange 86 of flanged swaging sleeve 80. The upper portion of flanged swaging sleeve 80 includes a swaging sleeve which can be swaged over flared portion 65 of standard rigging fixture 16 to form swaged region 37.

Figure 32:
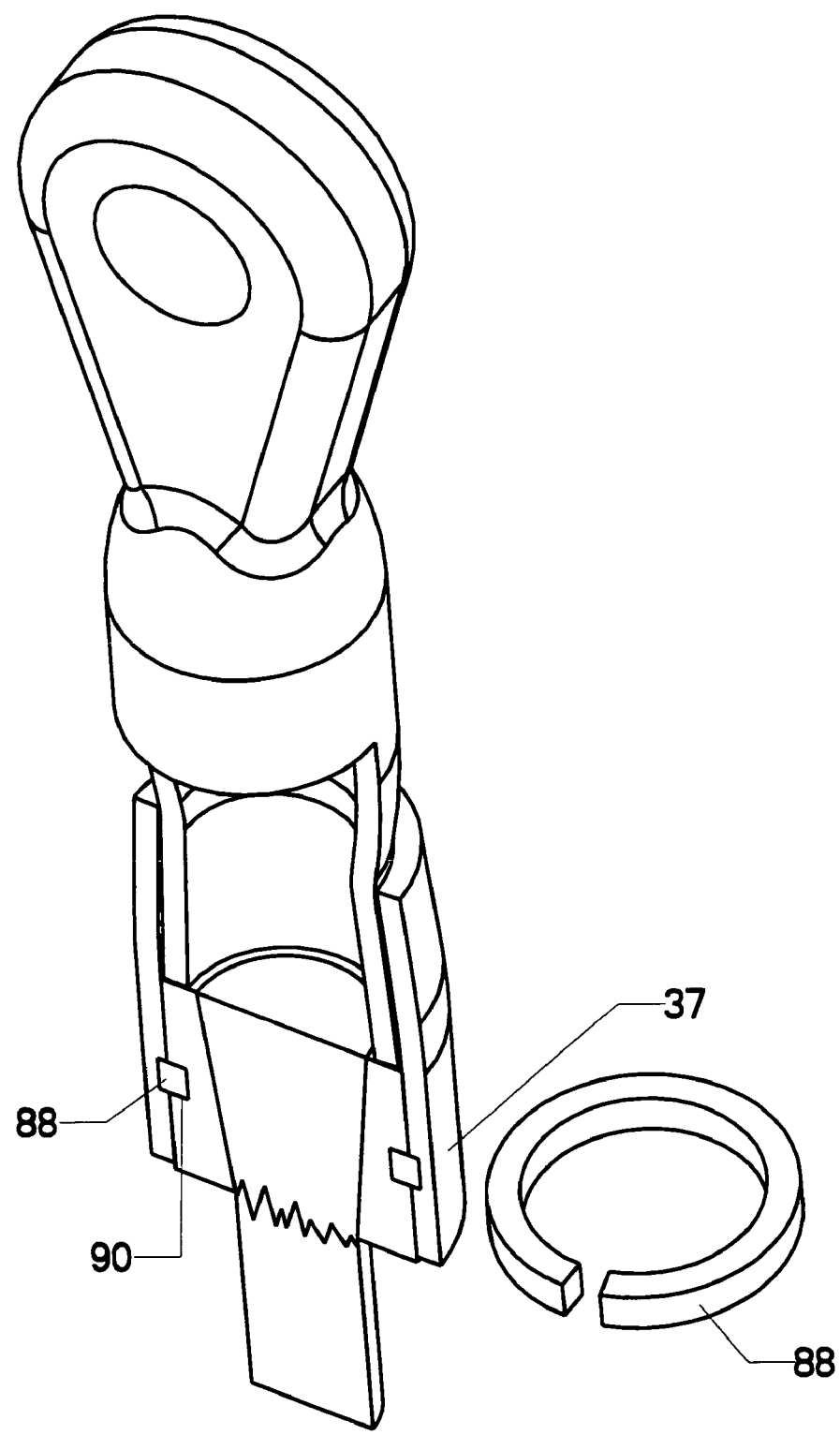
FIG. 32 is a partial section view, showing the use of a locking ring to augment the swaging

Other features can be included two improve the swaged connections. As an example, other features can be placed between the two surfaces to be swaged in order to create mechanical interferences—thereby increasing the strength of the swaged joint. FIG. 32—another partial section view—shows an assembly using a hard metal locking ring 88. A non-sectioned locking ring is shown in the right side of the view. The anchor is provided with a circumferential ring recess 90. Locking ring 88 is stretched open and snapped into this ring recess. The swaging sleeve is then swaged over the ring to form swaged region 37. The material of the swaging sleeve plastically deforms around the locking ring as the locking ring is tightly squeezed into ring recess 90. A strong mechanical interference is thereby created.

Finally, there are numerous permutations of the options presented which have not been described in detail. As one example, the threaded swaging coupler of FIG. 18 could be provided with an internal swaging sleeve as shown in FIGS. 26 and 27. While it is impractical to illustrate every possible permutation, the reader will understand that the components described can be combined in many different ways. The scope of the present invention should thus be defined by the following claims rather than any specific examples given.

The invention claimed is:

1. A system for attaching a rigging fixture to an end of a synthetic cable, wherein said rigging fixture includes a swaging surface, comprising:
   a. an anchor, attached to said cable, wherein said anchor has a first end proximate said end of said cable and a second end proximate to said cable but distal to said end of said cable;
   b. a swaging sleeve attached to said first end of said anchor and extending away from said cable;
   c. wherein said swaging sleeve assumes the form of a first hollow cylinder;
   d. wherein said swaging surface is the exterior of a second hollow cylinder sized to slidably engage said first hollow cylinder
   e. wherein said second hollow cylinder is slidably engaged with said first hollow cylinder so that said first and second hollow cylinders overlap one another to form an overlapped region; and
   f. wherein said overlapped region is swaged inward in order to create a mechanical engagement, thereby locking said rigging fixture to said anchor.

2. An attachment system as recited in claim 1, wherein said anchor is attached to said cable by potting.

3. An attachment system as recited in claim 2, wherein said attachment between said swaging sleeve and said first end of said anchor comprises:
   a. a threaded coupler;
   b. wherein said threaded coupler is threadedly attached to said anchor; and
   c. wherein said swaging sleeve is threadedly attached to said threaded coupler.

4. An attachment system as recited in claim 1, wherein said anchor is attached to said cable by mechanical friction.

5. An attachment system as recited in claim 4, wherein said attachment between said swaging sleeve and said first end of said anchor comprises:
   a. a threaded coupler;
   b. wherein said threaded coupler is threadedly attached to said anchor; and
   c. wherein said swaging sleeve is threadedly attached to said threaded coupler.

6. An attachment system as recited in claim 1, wherein said attachment between said swaging sleeve and said first end of said anchor comprises:
   a. a threaded coupler;
   b. wherein said threaded coupler is threadedly attached to said anchor; and
   c. wherein said swaging sleeve is threadedly attached to said threaded coupler.

\* \* \* \* \*